(12) United States Patent
Josephs et al.

(10) Patent No.: US 10,311,412 B1
(45) Date of Patent: Jun. 4, 2019

(54) METHOD AND SYSTEM FOR PROVIDING BUNDLED ELECTRONIC PAYMENT AND REMITTANCE ADVICE

(75) Inventors: David Adam Josephs, Deer Park, IL (US); John Michael Prince, Chicago, IL (US); Stuart Mitchell Hanson, Darien, IL (US); Marc Lawrence Fredman, Chicago, IL (US); Andrew Yih Hwang, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 418 days.

(21) Appl. No.: 12/731,278

(22) Filed: Mar. 25, 2010

Related U.S. Application Data

(63) Continuation of application No. 10/400,407, filed on Mar. 28, 2003, now abandoned.

(51) Int. Cl.
    *G06Q 40/00* (2012.01)
    *G06Q 20/10* (2012.01)
    (Continued)

(52) U.S. Cl.
    CPC .......... *G06Q 20/102* (2013.01); *G06Q 30/04* (2013.01); *G06Q 40/00* (2013.01); *G06Q 40/02* (2013.01)

(58) Field of Classification Search
    CPC ...... G06Q 20/102; G06Q 30/04; G06Q 40/02; G06Q 40/00
    (Continued)

(56) References Cited

U.S. PATENT DOCUMENTS

| 2,005,003 A | 6/1935 | Patton et al. |
| 3,653,480 A | 4/1972 | Yamamoto |

(Continued)

FOREIGN PATENT DOCUMENTS

| EP | 0099999 | 7/1983 |
| EP | 421808 | 4/1991 |

(Continued)

OTHER PUBLICATIONS

Hansen, B. (1996). Exploring the benefits of full-service EDI networks. Healthcare Financial Management, 50, p64(3). Retrieved from https://dialog.proquest.com/professional/docview/768291664?accountid=142257 on Mar. 22, 2019 (Year: 1996).*

(Continued)

*Primary Examiner* — Kito R Robinson
(74) *Attorney, Agent, or Firm* — Hunton Andrews Kurth LLP

(57) ABSTRACT

According to one embodiment, the present invention relates to a method and a system for transmitting bundled electronic payment and remittance advice for facilitating settlement of claim payments between payers (e.g., insurance companies) and providers (e.g., doctors, hospitals) or suppliers. According to an embodiment of the present invention, the method comprises the steps of receiving an electronic transmission from the payer wherein the electronic transmission comprises payment information and remittance advice; separating the payment information and the remittance advice; routing the payment information to a depository associated with the provider for making a payment authorized by the payer; transmitting the remittance advice to an intended recipient; and confirming the payment and transmission of remittance advice to the payer and the provider.

26 Claims, 6 Drawing Sheets

(51) Int. Cl.
*G06Q 30/04* (2012.01)
*G06Q 40/02* (2012.01)

(58) Field of Classification Search
USPC .......................................................... 705/4
See application file for complete search history.

(56) References Cited

U.S. PATENT DOCUMENTS

| | | | |
|---|---|---|---|
| 3,938,090 A | 2/1976 | Borison et al. | |
| 4,050,375 A | 9/1977 | Orleans | |
| 4,141,078 A | 2/1979 | Bridges et al. | |
| 4,205,780 A | 6/1980 | Burns | |
| 4,264,808 A | 4/1981 | Owens et al. | |
| 4,321,672 A | 3/1982 | Braun | |
| 4,396,985 A | 8/1983 | Ohara | |
| 4,443,027 A | 4/1984 | McNeely et al. | |
| 4,453,074 A | 6/1984 | Weinstein | |
| 4,454,414 A | 6/1984 | Benton | |
| RE31,692 E | 10/1984 | Tyburski et al. | |
| 4,495,018 A | 1/1985 | Vohrer | |
| 4,575,621 A | 3/1986 | Dreifus | |
| 4,605,844 A | 8/1986 | Haggan | |
| 4,614,861 A | 9/1986 | Pavlov et al. | |
| 4,617,457 A | 10/1986 | Granzow | |
| 4,650,981 A | 3/1987 | Foletta | |
| 4,672,377 A | 6/1987 | Murphy | |
| 4,694,397 A | 9/1987 | Grant et al. | |
| 4,697,072 A | 9/1987 | Kawana | |
| 4,700,055 A | 10/1987 | Kashkashian | |
| 4,701,601 A | 10/1987 | Francini et al. | |
| 4,713,761 A | 12/1987 | Sharpe et al. | |
| 4,752,676 A | 6/1988 | Leonard et al. | |
| 4,752,877 A | 6/1988 | Roberts et al. | |
| 4,797,913 A | 1/1989 | Kaplan | |
| 4,799,156 A | 1/1989 | Shavit | |
| 4,807,177 A | 2/1989 | Ward | |
| 4,812,628 A | 3/1989 | Boston | |
| 4,823,264 A | 4/1989 | Deming | |
| 4,845,347 A | 7/1989 | McCrindle | |
| 4,859,837 A | 8/1989 | Halpern | |
| 4,893,333 A | 1/1990 | Baran et al. | |
| 4,931,793 A | 6/1990 | Fuhrmann et al. | |
| 4,939,674 A | 7/1990 | Price et al. | |
| 4,948,174 A | 8/1990 | Thomson et al. | |
| 4,974,878 A | 12/1990 | Josephson | |
| 4,975,841 A | 12/1990 | Kehnemuyi et al. | |
| 4,977,501 A | 12/1990 | Lefevre | |
| 4,988,849 A | 1/1991 | Sasaki | |
| 4,992,646 A | 2/1991 | Collin | |
| 4,992,940 A | 2/1991 | Dworkin | |
| 5,023,904 A | 6/1991 | Kaplan | |
| 5,053,607 A | 10/1991 | Carlson | |
| 5,054,096 A | 10/1991 | Beizer | |
| 5,072,380 A | 12/1991 | Randelman et al. | |
| 5,080,748 A | 1/1992 | Bonomi | |
| 5,097,115 A | 3/1992 | Ogasawara et al. | |
| 5,111,395 A | 5/1992 | Smith | |
| 5,121,945 A | 6/1992 | Thomson et al. | |
| 5,122,950 A | 6/1992 | Benton | |
| 5,136,502 A | 8/1992 | Van Remodel | |
| 5,175,682 A | 12/1992 | Higasshlyama | |
| 5,187,750 A | 2/1993 | Behera | |
| 5,198,975 A | 3/1993 | Baker | |
| 5,220,501 A | 6/1993 | Lawlor | |
| 5,224,034 A | 6/1993 | Katz et al. | |
| 5,225,978 A | 7/1993 | Petersen | |
| 5,237,159 A | 8/1993 | Stephens | |
| 5,237,620 A | 8/1993 | Deaton | |
| 5,257,486 A | 11/1993 | Holmwall | |
| 5,265,007 A | 11/1993 | Bernhard, Jr. et al. | |
| 5,276,311 A | 1/1994 | Hennige | |
| 5,283,829 A | 2/1994 | Anderson | |
| 5,287,269 A | 2/1994 | Dorrough | |
| 5,311,594 A | 5/1994 | Penzias | |
| 5,315,508 A | 5/1994 | Bain et al. | |
| 5,321,238 A | 6/1994 | Kamata | |
| 5,326,959 A * | 7/1994 | Perazza | G06Q 20/10 235/379 |
| 5,336,870 A | 8/1994 | Hughes | |
| 5,349,170 A | 9/1994 | Kern | |
| 5,350,906 A | 9/1994 | Brody | |
| 5,351,187 A | 9/1994 | Hassett | |
| 5,352,877 A | 10/1994 | Morley | |
| 5,367,581 A | 11/1994 | Abel | |
| 5,373,550 A | 12/1994 | Campbell | |
| 5,382,784 A | 1/1995 | Eberhardt | |
| 5,396,417 A | 3/1995 | Burks | |
| 5,402,474 A | 3/1995 | Miller | |
| 5,412,190 A | 5/1995 | Josephson | |
| 5,420,405 A | 5/1995 | Chasek | |
| 5,424,938 A | 6/1995 | Wagner | |
| 5,444,841 A | 6/1995 | Glaser | |
| 5,430,644 A | 7/1995 | Deaton | |
| 5,432,506 A | 7/1995 | Chapman | |
| 5,444,794 A | 8/1995 | Uhland, Sr. | |
| 5,446,740 A | 8/1995 | Yien | |
| 5,448,471 A | 9/1995 | Deaton | |
| 5,459,482 A | 10/1995 | Orlen | |
| 5,464,968 A | 11/1995 | Germain et al. | |
| 5,465,206 A | 11/1995 | Hilt | |
| 5,477,040 A | 12/1995 | Lalonde | |
| 5,479,494 A | 12/1995 | Clitherow | |
| 5,479,532 A | 12/1995 | Abel | |
| 5,483,445 A | 1/1996 | Pickering | |
| 5,495,981 A | 3/1996 | Warther | |
| 5,500,890 A | 3/1996 | Rogge et al. | |
| 5,502,576 A | 3/1996 | Ramsay et al. | |
| 5,504,677 A | 4/1996 | Pollin | |
| 5,506,691 A | 4/1996 | Bednar | |
| 5,508,731 A | 4/1996 | Kohorn | |
| 5,532,464 A | 7/1996 | Josephson et al. | |
| 5,532,689 A | 7/1996 | Bueno | |
| 5,537,314 A | 7/1996 | Kanter | |
| 5,541,583 A | 7/1996 | Mandelbaum | |
| 5,544,040 A | 8/1996 | Gerbaulet | |
| 5,544,043 A | 8/1996 | Mild et al. | |
| 5,544,046 A | 8/1996 | Niwa | |
| 5,550,734 A * | 8/1996 | Tarter | G06Q 10/10 705/2 |
| 5,551,021 A | 8/1996 | Harada | |
| 5,557,515 A | 9/1996 | Abbruzzese | |
| 5,563,400 A | 10/1996 | Le Roux | |
| 5,566,330 A | 10/1996 | Sheffield | |
| 5,568,489 A | 10/1996 | Yien | |
| 5,570,465 A | 10/1996 | Tsakanikas | |
| 5,572,004 A | 11/1996 | Raimann | |
| 5,583,759 A | 12/1996 | Geer | |
| 5,583,760 A | 12/1996 | Klesse | |
| 5,590,196 A | 12/1996 | Moreau | |
| 5,590,197 A | 12/1996 | Chen | |
| 5,592,377 A | 1/1997 | Lipkin | |
| 5,592,378 A | 1/1997 | Cameron | |
| 5,599,528 A | 2/1997 | Igaki | |
| 5,602,936 A | 2/1997 | Green et al. | |
| 5,603,025 A | 2/1997 | Tabb | |
| 5,615,109 A | 3/1997 | Eder | |
| 5,617,474 A | 4/1997 | Ditzig et al. | |
| 5,619,558 A | 4/1997 | Jheeta | |
| 5,621,201 A | 4/1997 | Langhans | |
| 5,621,812 A | 4/1997 | Deaton et al. | |
| 5,649,114 A | 4/1997 | Deaton et al. | |
| 5,642,485 A | 5/1997 | Deaton et al. | |
| 5,638,457 A | 6/1997 | Deaton et al. | |
| 5,640,577 A | 6/1997 | Schermer | |
| 5,642,419 A | 6/1997 | Rosen | |
| 5,644,723 A | 7/1997 | Deaton et al. | |
| 5,644,778 A * | 7/1997 | Burks | G06Q 40/02 705/2 |
| 5,649,117 A | 7/1997 | Landry | |
| 5,652,786 A | 7/1997 | Rogers | |
| 5,659,165 A | 8/1997 | Jennings | |
| 5,659,469 A | 8/1997 | Deaton | |
| 5,659,741 A | 8/1997 | Eberhardt | |

(56) References Cited

U.S. PATENT DOCUMENTS

| | | | |
|---|---|---|---|
| 5,665,952 A * | 9/1997 | Ziarno | A47G 33/00 |
| | | | 235/380 |
| 5,666,493 A | 9/1997 | Wojcik et al. | |
| 5,677,521 A | 10/1997 | Garrou | |
| 5,677,955 A | 10/1997 | Doggett | |
| 5,679,938 A | 10/1997 | Templeton | |
| 5,679,940 A | 10/1997 | Templeton | |
| 5,680,459 A | 10/1997 | Hook et al. | |
| 5,687,250 A | 11/1997 | Curley et al. | |
| 5,687,322 A | 11/1997 | Deaton et al. | |
| 5,692,132 A | 11/1997 | Hogan | |
| 5,698,837 A | 12/1997 | Furuta | |
| 5,699,528 A | 12/1997 | Hogan | |
| 5,703,344 A | 12/1997 | Bezy | |
| 5,704,044 A | 12/1997 | Tarter | |
| 5,708,422 A | 1/1998 | Blonder | |
| 5,710,889 A | 1/1998 | Clark | |
| 5,715,298 A | 2/1998 | Rogers | |
| 5,715,314 A * | 2/1998 | Payne | G06Q 10/087 |
| | | | 705/26.35 |
| 5,715,399 A | 2/1998 | Bezos | |
| 5,717,989 A | 2/1998 | Tozzoli et al. | |
| 5,724,424 A | 3/1998 | Gifford | |
| 5,727,249 A | 3/1998 | Pollin | |
| 5,748,780 A | 5/1998 | Stoifo | |
| 5,751,842 A | 5/1998 | Riach | |
| 5,757,917 A | 5/1998 | Rose et al. | |
| 5,770,843 A | 6/1998 | Rose | |
| 5,774,553 A | 6/1998 | Rosen | |
| 5,783,808 A | 7/1998 | Josephson | |
| 5,784,696 A | 7/1998 | Melnikof | |
| 5,787,403 A | 7/1998 | Randle | |
| 5,789,732 A | 8/1998 | McMahon et al. | |
| 5,793,861 A | 8/1998 | Haigh | |
| 5,794,221 A | 8/1998 | Egendorf | |
| 5,796,827 A | 8/1998 | Coppersmith et al. | |
| 5,802,498 A | 9/1998 | Comesanas | |
| 5,802,499 A | 9/1998 | Sampson et al. | |
| 5,819,236 A | 10/1998 | Josephson | |
| 5,819,238 A | 10/1998 | Fernholz | |
| 5,823,463 A | 10/1998 | Fissmann | |
| 5,832,090 A | 11/1998 | Raspotnik | |
| 5,832,447 A | 11/1998 | Rieker | |
| 5,832,457 A | 11/1998 | O'Brien | |
| 5,832,488 A | 11/1998 | Eberhardt | |
| 5,835,580 A | 11/1998 | Fraser | |
| 5,835,899 A | 11/1998 | Rose et al. | |
| 5,852,811 A | 12/1998 | Atkins | |
| 5,870,723 A | 2/1999 | Pare | |
| 5,878,141 A | 3/1999 | Daly et al. | |
| 5,880,446 A * | 3/1999 | Mori | G06Q 20/04 |
| | | | 235/380 |
| 5,883,377 A | 3/1999 | Chapin, Jr. | |
| 5,884,290 A | 3/1999 | Smorodinsky et al. | |
| 5,897,625 A | 4/1999 | Gustin | |
| 5,898,157 A | 4/1999 | Mangili et al. | |
| 5,903,881 A | 5/1999 | Schrader | |
| 5,907,142 A | 5/1999 | Kelsey | |
| 5,910,896 A | 6/1999 | Hahn-Carlson | |
| 5,910,988 A | 6/1999 | Ballard | |
| 5,915,246 A | 6/1999 | Patterson et al. | |
| 5,917,965 A | 6/1999 | Cahill et al. | |
| 5,940,811 A | 8/1999 | Norris | |
| 5,940,844 A | 8/1999 | Cahill | |
| 5,943,656 A | 8/1999 | Crooks | |
| 5,945,653 A | 8/1999 | Walker | |
| 5,949,044 A | 9/1999 | Walker et al. | |
| 5,950,174 A | 9/1999 | Brendzel | |
| 5,956,700 A | 9/1999 | Landry | |
| 5,963,659 A | 10/1999 | Cahill et al. | |
| 5,963,925 A | 10/1999 | Kolling et al. | |
| 5,966,698 A | 10/1999 | Pollin | |
| 5,970,475 A | 10/1999 | Barnes et al. | |
| 5,978,780 A | 11/1999 | Watson | |
| 5,987,434 A | 11/1999 | Libman | |
| 5,987,435 A | 11/1999 | Weiss et al. | |
| 5,987,436 A | 11/1999 | Halbrook | |
| 5,987,439 A | 11/1999 | Gustin et al. | |
| 5,991,749 A | 11/1999 | Morrill, Jr. | |
| 5,991,750 A | 11/1999 | Craig | |
| 6,000,832 A | 12/1999 | Franklin et al. | |
| 6,002,767 A | 12/1999 | Kramer | |
| 6,003,762 A | 12/1999 | Hayashida | |
| 6,006,205 A | 12/1999 | Loeb et al. | |
| 6,009,442 A | 12/1999 | Chen | |
| 60,062,008 | 12/1999 | Forst | |
| 6,014,636 A | 1/2000 | Reeder | |
| 6,016,482 A | 1/2000 | Molinari et al. | |
| 6,016,484 A | 1/2000 | Williams et al. | |
| 6,018,718 A | 1/2000 | Walker et al. | |
| 6,026,388 A | 2/2000 | Liddy et al. | |
| 6,029,139 A | 2/2000 | Cunningham et al. | |
| 6,029,153 A | 2/2000 | Bauchner et al. | |
| 6,032,133 A | 2/2000 | Hilt et al. | |
| 6,032,134 A | 2/2000 | Weissman | |
| 6,032,136 A | 2/2000 | Brake, Jr. et al. | |
| 6,032,137 A | 2/2000 | Ballard | |
| 6,035,281 A | 3/2000 | Crosskey et al. | |
| 6,035,285 A | 3/2000 | Schlect et al. | |
| 6,035,287 A | 3/2000 | Stallaert et al. | |
| 6,036,099 A | 3/2000 | Leighton | |
| 6,036,553 A | 3/2000 | Hyde, Jr. | |
| 6,041,312 A | 3/2000 | Bickerton et al. | |
| 6,041,315 A | 3/2000 | Pollin | |
| 6,044,362 A | 3/2000 | Neely | |
| 6,045,039 A | 4/2000 | Stinson et al. | |
| 6,047,261 A | 4/2000 | Siefert | |
| 6,052,674 A | 4/2000 | Zervides et al. | |
| 6,058,380 A | 5/2000 | Anderson et al. | |
| 6,058,381 A | 5/2000 | Nelson | |
| 6,061,665 A | 5/2000 | Bahreman | |
| 6,064,764 A | 5/2000 | Bhaskaran et al. | |
| 6,064,987 A | 5/2000 | Walker et al. | |
| 6,065,675 A | 5/2000 | Teicher | |
| 6,067,524 A | 5/2000 | Byerly | |
| 6,070,150 A | 5/2000 | Remington et al. | |
| 6,070,798 A | 6/2000 | Nethery | |
| 6,073,104 A | 6/2000 | Field | |
| 6,073,113 A | 6/2000 | Guinan | |
| 6,076,072 A | 6/2000 | Libman | |
| 6,078,907 A | 6/2000 | Lamm | |
| 6,081,790 A | 6/2000 | Rosen | |
| 6,105,011 A | 6/2000 | Morrison, Jr. | |
| 6,085,168 A * | 7/2000 | Mori | G06Q 20/00 |
| | | | 705/17 |
| 6,088,683 A | 7/2000 | Jalili | |
| 6,088,685 A | 7/2000 | Kiron et al. | |
| 6,088,686 A | 7/2000 | Walker et al. | |
| 6,092,052 A * | 7/2000 | Ziarno | G06Q 20/04 |
| | | | 705/16 |
| 6,092,056 A | 7/2000 | Tull, Jr. et al. | |
| 6,092,057 A | 7/2000 | Zimmerman et al. | |
| 6,098,053 A | 8/2000 | Slater | |
| 6,098,070 A | 8/2000 | Maxwell | |
| 6,101,479 A | 8/2000 | Shaw | |
| 6,105,007 A | 8/2000 | Norris | |
| 6,106,641 A | 8/2000 | Kenna et al. | |
| 6,108,639 A | 8/2000 | Walker et al. | |
| 6,110,044 A | 8/2000 | Stern | |
| 6,111,858 A | 8/2000 | Greaves | |
| 6,115,690 A | 9/2000 | Wong | |
| 6,119,106 A | 9/2000 | Mersky et al. | |
| 6,119,107 A | 9/2000 | Polk | |
| 6,125,354 A | 9/2000 | MacFarlane et al. | |
| 6,128,599 A | 10/2000 | Walker et al. | |
| 6,128,602 A | 10/2000 | Northington et al. | |
| 6,128,603 A | 10/2000 | Dent et al. | |
| 6,129,273 A | 10/2000 | Shah | |
| 6,138,102 A * | 10/2000 | Hinckley, Jr. | G06Q 40/02 |
| | | | 705/2 |
| 6,138,118 A | 10/2000 | Koppstein et al. | |
| 6,138,917 A | 10/2000 | Chapin, Jr. | |
| 6,141,666 A | 10/2000 | Tobin | |
| 6,144,946 A | 11/2000 | Iwamura | |

(56) References Cited

U.S. PATENT DOCUMENTS

| | | | |
|---|---|---|---|
| 6,148,293 A | 11/2000 | King |
| 6,149,055 A | 11/2000 | Gatto |
| 6,149,056 A | 11/2000 | Stinson |
| 6,173,272 B1 | 1/2001 | Thomas et al. |
| 6,181,837 B1 | 1/2001 | Cahill |
| 6,185,542 B1 | 2/2001 | Moran et al. |
| 6,185,544 B1 | 2/2001 | Sakamoto et al. |
| 6,188,309 B1 | 2/2001 | Levine |
| 6,202,054 B1 | 3/2001 | Lawlor et al. |
| 6,205,433 B1 | 3/2001 | Boesch et al. |
| 6,208,973 B1 * | 3/2001 | Boyer ............... G06Q 20/02 705/2 |
| 6,213,391 B1 | 4/2001 | Lewis |
| 6,223,168 B1 * | 4/2001 | McGurl ............. G06Q 20/02 705/39 |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 | 5/2001 | Shkedy |
| 6,240,444 B1 | 5/2001 | Fin et al. |
| 6,243,689 B1 | 6/2001 | Norton |
| 6,253,998 B1 * | 7/2001 | Ziarno ............... A47G 33/00 235/380 |
| 6,267,292 B1 | 7/2001 | Walker et al. |
| 6,278,981 B1 | 8/2001 | Dembo et al. |
| 6,289,322 B1 | 9/2001 | Kitchen et al. |
| 6,292,789 B1 * | 9/2001 | Schutzer ........... G06Q 20/04 705/34 |
| 6,301,379 B1 | 10/2001 | Thompson et al. |
| 6,301,567 B1 | 10/2001 | Leong et al. |
| 6,304,858 B1 | 10/2001 | Mosier et al. |
| 6,305,603 B1 | 10/2001 | Grunbok, Jr. et al. |
| 6,308,887 B1 | 10/2001 | Korman et al. |
| 6,321,212 B1 | 11/2001 | Lange |
| 6,324,524 B1 | 11/2001 | Lent et al. |
| 6,327,575 B1 | 12/2001 | Katz |
| 6,338,047 B1 | 1/2002 | Walkman |
| 6,338,049 B1 | 1/2002 | Walker et al. |
| 6,341,724 B2 | 1/2002 | Campisano |
| 6,343,279 B1 | 1/2002 | Bissonette et al. |
| 6,349,290 B1 | 2/2002 | Horowitz et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,405,181 B2 | 6/2002 | Lent et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,424,949 B1 | 7/2002 | Deaton et al. |
| 6,434,159 B1 | 8/2002 | Woodward et al. |
| 6,446,072 B1 | 9/2002 | Schulze et al. |
| 6,460,020 B1 | 10/2002 | Pool et al. |
| 6,485,922 B1 | 11/2002 | Erickson et al. |
| 6,490,568 B1 | 12/2002 | Omara et al. |
| 6,493,685 B1 | 12/2002 | Ensel et al. |
| 6,513,019 B2 | 1/2003 | Lewis |
| 6,535,896 B2 | 3/2003 | Britton et al. |
| 6,536,663 B1 | 3/2003 | Lozier et al. |
| 6,554,185 B1 | 4/2003 | Montross et al. |
| 6,560,581 B1 | 5/2003 | Fox et al. |
| 6,567,791 B2 | 5/2003 | Lent et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,607,127 B2 | 8/2003 | Wong |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | McNeal |
| D490,840 S | 6/2004 | Arakaki et al. |
| D491,186 S | 6/2004 | Arakaki et al. |
| D491,953 S | 6/2004 | Arakaki et al. |
| D496,365 S | 9/2004 | Liu et al. |
| D498,236 S | 11/2004 | Liu et al. |
| 6,816,721 B1 * | 11/2004 | Rudisill ............. G06Q 20/102 455/406 |
| 6,820,058 B2 | 11/2004 | Wood et al. |
| 6,824,066 B2 | 11/2004 | Weyant |
| 6,825,940 B1 | 11/2004 | Wu et al. |
| 6,860,375 B2 | 3/2005 | Hallowell et al. |
| 6,865,547 B1 | 3/2005 | Brake, Jr. et al. |
| 6,954,896 B1 | 10/2005 | Dodrill et al. |
| 6,965,882 B1 | 11/2005 | Lapstun et al. |
| 6,970,259 B1 | 11/2005 | Lunt et al. |
| 6,970,830 B1 | 11/2005 | Samra et al. |
| 6,970,855 B2 | 11/2005 | Das et al. |
| RE38,957 E | 1/2006 | Laussermair et al. |
| 6,999,943 B1 | 2/2006 | Johnson et al. |
| 7,004,382 B2 | 2/2006 | Sandru |
| 7,025,256 B1 | 4/2006 | Drummond et al. |
| 7,062,456 B1 | 6/2006 | Riehl et al. |
| 7,068,832 B1 | 6/2006 | Price et al. |
| 7,070,095 B1 | 7/2006 | Gandel et al. |
| 7,104,443 B1 | 9/2006 | Paul et al. |
| 7,133,846 B1 | 11/2006 | Ginter et al. |
| 7,177,836 B1 | 2/2007 | German et al. |
| 7,194,437 B1 | 3/2007 | Britto et al. |
| 7,200,255 B2 | 4/2007 | Jones et al. |
| 7,228,155 B2 | 6/2007 | Saunders |
| 7,249,112 B2 | 7/2007 | Berardi et al. |
| 7,251,656 B2 * | 7/2007 | Keown ............... G06Q 20/00 |
| 7,312,707 B1 | 12/2007 | Bishop et al. |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom |
| RE40,220 E | 4/2008 | Nichols et al. |
| 7,376,622 B1 * | 5/2008 | Padalino ............ G06Q 20/108 705/42 |
| 7,380,707 B1 | 6/2008 | Fredman |
| 7,401,048 B2 | 7/2008 | Rosedale et al. |
| 7,493,288 B2 | 2/2009 | Biship et al. |
| 7,546,272 B2 | 6/2009 | Loy |
| 7,587,363 B2 | 9/2009 | Cataline et al. |
| 7,805,365 B1 * | 9/2010 | Slavin ............... G06Q 20/10 705/39 |
| 7,849,009 B2 * | 12/2010 | Compiano ......... G06Q 20/102 705/35 |
| 7,945,492 B1 * | 5/2011 | Sun .................. G06Q 10/08 705/28 |
| 8,255,326 B2 * | 8/2012 | Compiano ......... G06Q 20/102 705/30 |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0027441 A1 | 10/2001 | Wankmueller |
| 2001/0032139 A1 | 10/2001 | Debonnet, Jr. |
| 2001/0034663 A1 | 10/2001 | Teveler et al. |
| 2001/0037300 A1 | 11/2001 | Miyazaki et al. |
| 2001/0037309 A1 | 11/2001 | Vrain |
| 2001/0038033 A1 | 11/2001 | Habib |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0032651 A1 | 3/2002 | Embrey |
| 2002/0038363 A1 | 3/2002 | MacLean |
| 2002/0046169 A1 | 4/2002 | Keresman, III et al. |
| 2002/0047316 A1 | 4/2002 | Chitayat |

(56) References Cited

U.S. PATENT DOCUMENTS

| | | | |
|---|---|---|---|
| 2002/0049816 A1* | 4/2002 | Costin, IV | G06Q 30/0601 709/206 |
| 2002/0052842 A1 | 5/2002 | Schuba et al. | |
| 2002/0055907 A1 | 5/2002 | Pater et al. | |
| 2002/0069134 A1 | 6/2002 | Solomon | |
| 2002/0072976 A1 | 6/2002 | Virtanen et al. | |
| 2002/0077978 A1 | 6/2002 | O'Leary et al. | |
| 2002/0082985 A1 | 6/2002 | MacKay | |
| 2002/0084321 A1 | 7/2002 | Martens et al. | |
| 2002/0087415 A1 | 7/2002 | Allen | |
| 2002/0087468 A1 | 7/2002 | Ganesan et al. | |
| 2002/0087469 A1 | 7/2002 | Ganesan et al. | |
| 2002/0091635 A1 | 7/2002 | Dilip et al. | |
| 2002/0100803 A1 | 8/2002 | Sehr | |
| 2002/0107770 A1 | 8/2002 | Meyer et al. | |
| 2002/0107788 A1 | 8/2002 | Cunningham | |
| 2002/0111837 A1 | 8/2002 | Aupperle | |
| 2002/0116214 A1* | 8/2002 | Horn | G06Q 30/02 705/329 |
| 2002/0128981 A1 | 9/2002 | Kawan et al. | |
| 2002/0138390 A1 | 9/2002 | May | |
| 2002/0138398 A1 | 9/2002 | Kalin et al. | |
| 2002/0156723 A1 | 10/2002 | Lilly et al. | |
| 2002/0169658 A1 | 11/2002 | Adler | |
| 2002/0170966 A1 | 11/2002 | Hannigan et al. | |
| 2002/0178071 A1 | 11/2002 | Walker et al. | |
| 2002/0184151 A1 | 12/2002 | Maloney | |
| 2002/0194081 A1 | 12/2002 | Perkowski | |
| 2002/0194096 A1 | 12/2002 | Falcone et al. | |
| 2002/0198817 A1 | 12/2002 | Dhir | |
| 2002/0199182 A1 | 12/2002 | Whitehead | |
| 2003/0004867 A1* | 1/2003 | Kight | G06Q 20/02 705/39 |
| 2003/0018557 A1 | 1/2003 | Gilbert et al. | |
| 2003/0018567 A1 | 1/2003 | Flitcroft et al. | |
| 2003/0028481 A1 | 2/2003 | Flitcroft et al. | |
| 2003/0037002 A1 | 2/2003 | Higgins et al. | |
| 2003/0040959 A1 | 2/2003 | Fei et al. | |
| 2003/0046218 A1 | 3/2003 | Albanese et al. | |
| 2003/0055675 A1 | 3/2003 | Klein Twennaar | |
| 2003/0069780 A1 | 4/2003 | Hailwood et al. | |
| 2003/0074332 A1* | 4/2003 | Tanabe | G06Q 20/403 705/400 |
| 2003/0097335 A1 | 5/2003 | Muskowitz et al. | |
| 2003/0097336 A1 | 5/2003 | Muskowitz et al. | |
| 2003/0100803 A1 | 5/2003 | Lu et al. | |
| 2003/0105641 A1 | 6/2003 | Lewis | |
| 2003/0105724 A1* | 6/2003 | Tsunekawa | G06Q 20/02 705/65 |
| 2003/0110070 A1 | 6/2003 | De Goeij | |
| 2003/0110136 A1 | 6/2003 | Wells et al. | |
| 2003/0110442 A1 | 6/2003 | Battle | |
| 2003/0120686 A1 | 6/2003 | Kim et al. | |
| 2003/0130945 A1 | 7/2003 | Force et al. | |
| 2003/0130952 A1 | 7/2003 | Bell et al. | |
| 2003/0144942 A1 | 7/2003 | Sobek | |
| 2003/0149594 A1* | 8/2003 | Beazley | G06F 19/328 705/2 |
| 2003/0182206 A1* | 9/2003 | Hendrix | G06Q 30/0601 705/26.1 |
| 2003/0187787 A1 | 10/2003 | Freund | |
| 2003/0187789 A1 | 10/2003 | Karas et al. | |
| 2003/0191710 A1 | 10/2003 | Green et al. | |
| 2003/0200107 A1 | 10/2003 | Allen et al. | |
| 2003/0208421 A1 | 11/2003 | Vicknair et al. | |
| 2003/0208441 A1 | 11/2003 | Poplawski et al. | |
| 2003/0208445 A1* | 11/2003 | Compiano | G06Q 20/102 705/40 |
| 2003/0218066 A1 | 11/2003 | Fernandes et al. | |
| 2003/0225663 A1 | 12/2003 | Horan et al. | |
| 2003/0233305 A1 | 12/2003 | Solomon | |
| 2003/0237046 A1 | 12/2003 | Parker et al. | |
| 2004/0010465 A1 | 1/2004 | Michalski et al. | |
| 2004/0019605 A1* | 1/2004 | Keown | G06Q 20/00 |
| 2004/0029569 A1 | 2/2004 | Khan et al. | |
| 2004/0034595 A1* | 2/2004 | Kugeman | G06Q 20/102 705/40 |
| 2004/0049451 A1 | 3/2004 | Berardi | |
| 2004/0049456 A1* | 3/2004 | Dreyer | G06Q 20/04 705/40 |
| 2004/0064409 A1 | 4/2004 | Kight et al. | |
| 2004/0078328 A1 | 4/2004 | Talbert et al. | |
| 2004/0094624 A1 | 5/2004 | Fernandes et al. | |
| 2004/0117211 A1* | 6/2004 | Bonnell | G06Q 10/10 705/2 |
| 2004/0133516 A1 | 7/2004 | Buchanan et al. | |
| 2004/0149544 A1 | 8/2004 | Dal Ferro | |
| 2004/0159700 A1 | 8/2004 | Khan et al. | |
| 2004/0201735 A1 | 10/2004 | Baron | |
| 2004/0210498 A1 | 10/2004 | Freund | |
| 2004/0215560 A1* | 10/2004 | Amalraj | G06Q 20/04 705/40 |
| 2004/0228514 A1 | 11/2004 | Houle et al. | |
| 2004/0232223 A1 | 11/2004 | Beenau et al. | |
| 2004/0236688 A1 | 11/2004 | Bozeman | |
| 2004/0239481 A1 | 12/2004 | Beenau | |
| 2004/0252012 A1 | 12/2004 | Beenau et al. | |
| 2004/0254837 A1 | 12/2004 | Roshkoff | |
| 2004/0260607 A1 | 12/2004 | Robbins et al. | |
| 2005/0021466 A1 | 1/2005 | Buchanan et al. | |
| 2005/0033609 A1* | 2/2005 | Yang | G06Q 10/10 705/2 |
| 2005/0033619 A1 | 2/2005 | Barnes et al. | |
| 2005/0033690 A1 | 2/2005 | Antognini et al. | |
| 2005/0035847 A1 | 2/2005 | Bonalle et al. | |
| 2005/0040242 A1 | 2/2005 | Beenau et al. | |
| 2005/0055254 A1 | 3/2005 | Schmidtberg et al. | |
| 2005/0077349 A1 | 4/2005 | Bonalle et al. | |
| 2005/0086178 A1 | 4/2005 | Xie et al. | |
| 2005/0091156 A1 | 4/2005 | Hailwood et al. | |
| 2005/0097046 A1 | 5/2005 | Singfield | |
| 2005/0097050 A1 | 5/2005 | Orcutt | |
| 2005/0116024 A1 | 6/2005 | Beenau et al. | |
| 2005/0144059 A1 | 6/2005 | Schuessler | |
| 2005/0171898 A1 | 8/2005 | Bishop et al. | |
| 2005/0177480 A1 | 8/2005 | Huang | |
| 2005/0182721 A1* | 8/2005 | Weintraub | G06Q 20/102 705/40 |
| 2005/0202865 A1* | 9/2005 | Kim | G06Q 30/02 463/17 |
| 2005/0209954 A1 | 9/2005 | Asher et al. | |
| 2005/0228751 A1 | 10/2005 | Keown et al. | |
| 2005/0261955 A1 | 11/2005 | Humble et al. | |
| 2006/0036553 A1 | 2/2006 | Gupta et al. | |
| 2006/0041540 A1 | 2/2006 | Shannon | |
| 2006/0106650 A1 | 5/2006 | Bush | |
| 2006/0106717 A1 | 5/2006 | Randle et al. | |
| 2006/0136335 A1 | 6/2006 | Ferguson, III | |
| 2006/0161501 A1 | 7/2006 | Waserstein et al. | |
| 2006/0167989 A1 | 7/2006 | Bashen et al. | |
| 2006/0178986 A1 | 8/2006 | Giordano et al. | |
| 2006/0206427 A1 | 9/2006 | Love et al. | |
| 2006/0259390 A1 | 11/2006 | Rosenberger | |
| 2006/0265255 A1* | 11/2006 | Williams | G06Q 10/087 705/4 |
| 2006/0282389 A1 | 12/2006 | Gupte | |
| 2006/0287953 A1 | 12/2006 | Chauhan | |
| 2007/0005498 A1 | 1/2007 | Cataline et al. | |
| 2007/0033070 A1* | 2/2007 | Beck | G06Q 10/10 705/2 |
| 2007/0043593 A1* | 2/2007 | Provost | G06Q 30/04 705/2 |
| 2007/0138255 A1 | 6/2007 | Carreon et al. | |
| 2007/0265924 A1 | 11/2007 | Schwarz | |
| 2007/0288334 A1 | 12/2007 | Creedle et al. | |
| 2008/0010202 A1 | 1/2008 | Schwarz | |
| 2008/0116283 A1 | 5/2008 | Newbrough et al. | |
| 2008/0193008 A1 | 8/2008 | Mount et al. | |

(56) References Cited

U.S. PATENT DOCUMENTS

| | | |
|---|---|---|
| 2008/0228641 A1 | 9/2008 | Fredman |
| 2009/0043651 A1 | 2/2009 | Schwarz |

FOREIGN PATENT DOCUMENTS

| | | |
|---|---|---|
| EP | 0665486 | 8/1995 |
| EP | 1014318 | 6/2000 |
| JP | 2001-266039 | 9/2001 |
| JP | 2002-24618 | 1/2002 |
| JP | 2002-056063 | 2/2002 |
| JP | 2002-083241 | 3/2002 |
| JP | 2002-087536 | 3/2002 |
| JP | 2002-140505 | 5/2002 |
| WO | WO 9745796 | 4/1991 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 9612242 | 4/1996 |
| WO | WO 97/14108 | 4/1997 |
| WO | WO 9745814 | 12/1997 |
| WO | WO 98/09260 | 3/1998 |
| WO | WO 9910823 | 3/1999 |
| WO | WO 0039979 | 7/2000 |
| WO | WO 0175730 | 10/2001 |
| WO | WO 02/063432 A2 | 8/2002 |
| WO | WO 02/063432 A3 | 8/2002 |
| WO | WO 2004/079603 | 9/2004 |

OTHER PUBLICATIONS

How banks are boosting EDI volumes. (1995). Bank Technology News, 1. Retrieved from https://dialog.proquest.com/professional/docview/682025403?accountid=142257 on Mar. 22, 2019 (Year: 1995).*

Hunt, Robert M., An Introduction to the Economics of Payment Card Networks.

Dialog file 20, #10279554; Offer: Book Yourself Free Cassettes; Mar. 25, 2000; Birmingham Post, p. 16.

Armstrong, Douglas, Norwest eases difficulty of Interstate banking Bank's customers may use the same account number at any branch.

Maturi, Richard, Personal Finance; When you Need to Send Cash in a Flash.

Terrie Miller and Henry Yan, When Custody Governs, Benefits Canada, Toronto, Feb. 1998, vol. 22, Issue 2, p. 33, 5 pages.

Annual Report Pursuant to Sectin 13 or 15(d) of the Securities Exchange Act of 1934, Form 10-K, Intelidata Technologies Corporation, Fiscal Year Ended Dec. 31, 2001.

Blockbuster running test of a stored value card, the American Banker, Sep. 1, 1995.

CESNaBANCO introduces stored value card technology blockbuster video is first merchant partner.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments Ills, The American Banker, vol. 167, No. 154, Aug. 23, 2002.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying by Credit Card-Real World and Online, http://www.virtualschool.edu/mon/ElectronicProperty/klamond/credit, printed Jul. 8, 2005, 17 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

First Data markets stored-value cards, Cards International, Jan. 30, 1996, p. 5.

Norris, First data unit develops blockbuster cash card, Omaha World Hearld Sunrise Edition, Business Section, Jan. 19, 1996, p. 16.

Harsh Truth: Your Investments Likely Won't Make Any Money.

Money, Initial Launch to 200 Credit Unions, USA Today.com, Jun. 27, 2002.

Decovny, Net Scope, Banking Technology, May 1997.

Nokia Announces the World's First NFC Enabled Mobile Product for Contactless Payment and Ticketing, PRNewswire, Feb. 9, 2005.

Goode, On Profit, Loss and the Mysteries of the Mind, The New York Times, Nov. 5, 2002.

Anonymous, Operating in a multi-currency environment, ProQuest document ID 9215937, ISSN/ISBN 09589309, Oct. 1995.

Payment data, www.paymentdata.com, Mar. 5, 2004.

Press Release, Mar. 5, 2004, Payment Data Systems Files Patent on Debit Card Payment Solution, American City Business Journals, Inc., Mar. 5, 2004.

Anonymous, Systems spell change for foreign exchange, Global Investor, ProQuest document ID 1056152B, ISSN/ISBN: 09513604, Nov. 1996.

French, Tech Stocks: Market Movers, Investors Worry CheckFree Being Chased from Its Own Game, http://www.thestreet.com, Jun. 20, 2002.

Technology, In Brief Wachovia-InteliData Deal, May 7, 2002.

Zuckerman, The Hedge-Fund Craze, The Wall Street Journal, Jun. 12, 2002.

McDonald, The Stars in the Sky Flicker, and Fund Stars Do the Same, The Wall Street Journal, Jan. 15, 2003.

Financial News, Wells Fargo Rolls Out Nationwide Lockbox Check Conversion, PR Newswire Association, Apr. 22, 2003.

Unknown, 65_IEM Product Description Home Screen from Web Page.

Unknown, 66_Opening the Mail Simultaneous Image Capture, Bank News—New Solutions Oct. 1996.

Unknown, Business Publications—67_Wassau Financial Systems' ImageRPS and OPEX Interface a Perfect Match, Work Process Improvement Today, Dec. 1997.

Unknown, Business Publications—68_Chapter Reports: Texas Chapter, Work Process Improvement Today, Apr. 1998.

"PNC Bank Adds Chicago to National Lockbox Network" PRNewswire, Nov. 5, 1997.

Arend, "Bank applications fuel optical storage market" ABA Banking Journal Oct. 1991, p. 77 (lockbox).

"Alabama Department of Revenue Selects Unisys for imaging solution to speed tax returns, save taxpayers money" Business Wire, Sep. 6, 1995.

"BancTec Selects Alchemy CD-Based Archival Solution for Remittance Processing System" Business Wire, May 6, 1998.

Keaton, "Bank of America Completes its Rollout of 'Paperless' Processing of Payments" Wall Street Journal (Eastern Edition), Nov. 1, 1999, B.13 (lockbox).

Stanley, et al., "Bank of America Provides Nationwide Image Lockbox Services" Press Release, Bank of America, Oct. 20, 1999.

IA Corp. Wins Contract With Comerica to Install the First Digital All Items Archive . . . Business Wire, Jan. 9, 1997.

(56) References Cited

OTHER PUBLICATIONS

"IA Corp. Shows Complex Transaction Processing Software WorkVision at AIIM, plus CheckVision and RemitVision application frameworks for new advanced banking services . . . " Business Wire, Apr. 14, 1997.
Business Wire; Shawnut bank provides lockbox customers real-time, on-line electronic exception processing, 1A Corp's image-based lockbox system cuts processing time from days to minutes, dramatically increasing customer service; Jan. 9, 1996.
"Caere introduces the Model 1800 document remittance processor; compact unit provides cost effective means for low to medium speed document processing" Business Wire, Oct. 19, 1995.
Malyykhina, Elena, Cell Phone Software Formats Checks for Online Banking.
"Chase Image-Enables NY Wholesale Lockbox Facility with VICOR Technology" Press Release, Chase Manhattan Bank, Aug. 31, 1999.
"Chase offers image lockbox for Europe" Bank Systems &Technology, col. 34, issue 8, p. 37, Aug. 1997.
Unknown, "Crestar to Introduce New Advanced Cash management System Based on IA Corp. Software . . . " Business Wire, Oct. 28, 1996.
Matyas, Stephen M., Digital Signatures—An Overview; pp. 87-94; (1979).
Frits, M. William; Goodbye to paper?; ABA Banking Journal, Mar. 1989.
"IA Corp. Announces New CheckVision Products; New CheckVision Archive Software Supports Short- and Long-Term Check Image Archival With Dynamic, Multi-Tiered Migration" Business Wire, Apr. 1, 1996.
"IA Corporation Becomes a Major Player in Image-Based Cash Management Solutions" Business Wire, Nov. 24, 1995.
Unknown "IA Announces installation at QuestPoint of first client/server cash management system with check image storage compatible with IBM, NCR and Unisys" Business Wire, May 29, 1997.
Unknown "IA Presents New Advanced Cash Management Software at TMA to Link Banks and Their Corporate Customers . . . " Business Wire, Nov. 18, 1996.
Unknown "IA's RemitVision Adopted by Harris Bank for CD-ROM and Online Customer Viewing of Check and Remittance Documents; Continues banking industry trends to use image-based processing as strategic weapon and increase online customer access to bank records" Business Wire, May 28, 1996.
Fitch, "Image technology brings lockbox breakthroughs" Corporate Cashflow Magazine, Sep. 1995, vol. 16 No. 9, p. 16.
ABA Transaction Processing Committee, "Image-Based Transaction Processing—The Banking Industry's Challenge for the 1990s and Beyond" 1989 :pp. 5-9, 22, 26, 27, 52, 53.
Tauhert, "Lock Box Solutions reengineer Payments" Insurance & Technology, Aug. 1996, vol. 21 n. 8, p. 22.
Mead, "Two Banks' Imaging Deals Target Fee Revenue Increases" The American Banker, May 9, 1997, p. 11: (images only).
Moyer, Liz; Bank of Montreal to Install Imaging System by Unisys for Retail Lockbox Services; The American Banker; Oct. 22, 1996.
Moyer, Liz; KeyCorp joins trend to check imaging for lockbox; The American Banker; Aug. 23, 1996.
"NCR introduces 7780 item processing system; image-based system scans and reads documents" Business Wire, Mar. 11, 1992.
Marjanovic, "NationsBank Offers Lockbox Imaging" American Banker, Jun. 1995, vol. 160, No. 126, p. 20.
NationsBank Rolls Out First Wholesale Lockbox Imaging Item Processing Report, Potomac, Aug. 3, 1995, p. 1.
Shannon, "New lockbox platform due out at NationsBank" Bank Systems & Technology, Feb. 1998, vol. 35, issue 2, p. 38.
Maher and Troutman, Payor's Prescription for Painless Migration to Electronic Healthcare Payments and Remittance Advices, PNC Bank, Dec. 2001.
Buckley, JP et. al., Processing Noisy Structured Textual Data Using a Fuzzy Matching Approach Application to Postal Address Errors; XP-001132075; pp. 195-205 (11 pages); Dec. 2000.
Schutzer, Daniel; Get ready for electronic commerce; ABA Banking Journal; Jun. 1995.

\* cited by examiner

METHOD AND SYSTEM FOR PROVIDING BUNDLED ELECTRONIC PAYMENT AND REMITTANCE ADVICE

RELATED APPLICATIONS

This patent application is a Continuation of U.S. patent application Ser. No. 10/400,407 filed Mar. 28, 2003, now abandoned, which is hereby incorporated by reference herein in its entirety.

FIELD OF THE INVENTION

The present invention relates generally to electronic payments and, more particularly, to a method and system for transmitting and receiving bundled electronic payment and remittance advice for facilitating settlement of claim payments between payers (e.g., insurance companies) and providers (e.g., hospitals, physicians) or suppliers.

BACKGROUND OF THE INVENTION

Traditionally, payers and providers have overwhelmingly used paper checks and paper remittance advices to manage the flow of payment and information from the payer to the provider. This paper process is expensive and inefficient for both the payer and provider. Payers need to print checks and paper remittance advices, bundle the checks with the remittance advices, and then absorb the cost of postage to mail the combined payment and remittance advice. Providers bear the cost of processing the incoming mailed payment, manually depositing the check, and manually entering the data from the remittance advice into their accounts receivable system (also known as a patient accounting system or practice management system).

Patient payments (e.g., those payments made from an individual patient directly to a supplier) are also experiencing dramatic changes. Paper checks, long (and still) the dominant form of payment from patients to providers, are declining as a percentage of the payments that flow from patients to providers. Other forms of payment, including but not limited to, credit cards, debit cards, and other electronic payments (e.g., Automated Clearing House (ACH), etc.) are becoming more prevalent in the marketplace.

As an increasing percentage of both payer-to-provider and patient-to-provider payments and remittance information migrate to electronic forms, and the channels through which providers can receive payments and remittance information multiply, there is a need for a single source that can aggregate and process multiple types of payments (e.g., check, credit card, debit card, ACH) concurrent with the movement of electronic remittance advice for posting into provider accounts receivable systems.

A specific illustration of the challenges associated with electronic payment and remittance advice flowing between payers and suppliers can be found in the relationship between health care payers (i.e., health insurers) and health care providers (e.g., hospitals and physicians). After a patient receives treatment from a health care provider, such as a doctor or hospital, the health care provider forwards an invoice in the form of a claim to an insurance company for processing and payment. Upon receipt of the claim, the insurance company will adjudicate the claim, which involves determining whether the policy associated with the patient covers the treatment provided by the health care provider and determining the amount of payment, if any, required by the insurance company to the health care provider. Generally, a contract or other agreement is effective between the health care provider and the insurance company as to what services the insurance company will cover, the appropriate reimbursement for those services and the amount of the payment. After claim adjudication, the insurance company sends a payment (e.g., a check) and a remittance advice (RA) (also known as an Explanation of Benefits (EOB) or voucher) which provides a detailed breakdown of services, explanation of amount paid and/or other information associated with the patient. This RA will include detailed remittance information for each individual claim included in the payment (including charged amount, contracted rate, amount covered, patient responsibility, etc.) and for each of the procedure(s) associated with each claim.

Traditionally, the insurance company prints a check to reimburse a provider for services rendered over a specific time period. The insurance company also prints the RAs associated with the specific claim or claims that the check is intended to cover. Health care RAs contain information for specific health care encounters (e.g., a visit to the doctor or a hospital admission) and contain information regarding the service or services that were provided during that specific encounter. The check and RAs are then mailed to the provider. The provider may send the check to the provider's bank for deposit and a staff member will process the RAs, manually entering the information contained in the multiple RAs on a procedure-by-procedure basis. The check and/or remittance advice may also be mailed to a lockbox processor that processes the check and/or remittance advice on behalf of the provider, depositing the check in the provider's bank account and forwarding the remittance advice information to the provider in paper or electronic format. The information may be entered into an accounts receivable system. The provider must then periodically reconcile the accounts receivable information with the deposits in the provider's bank. The purpose of the reconciliation is to ensure that the payments posted to the accounts receivable system can be matched with the actual deposits made to the provider's bank.

For payers (e.g., insurers), the resources and efforts needed to print checks, print RAs, bundle the checks with the appropriate RAs, and mail the bundled checks and RAs are costly, labor intensive and time consuming. Similarly, for providers (e.g., hospitals, physicians) the resources and efforts needed to process paper checks, manually enter RA data and perform reconciliation are also costly, highly error-prone, labor intensive and time consuming.

In 1996, Congress passed and the President signed the Health Insurance Portability and Accountability Act of 1996 (HIPAA). HIPAA is a federal mandate that sets standards for security, privacy, transaction and code sets, and unique national identifiers that affect the entire health care industry. More specifically, HIPAA calls for standardization of electronic patient health data, administrative and financial data; unique health identifiers for individuals, employers, health plans and health care providers; and security standards protecting the confidentiality and integrity of individually identifiable health information. HIPAA affects all health care organizations, including physician offices, health plans, employers, public health authorities, life insurers, clearinghouses, billing agencies, information systems vendors, service organizations and universities. In addition, HIPAA calls for severe civil and criminal penalties for noncompliance. Some of HIPAA's purposes include streamlining current processes, reducing costs of claims, payment and remittance advice processing, and reducing the amount of paper associated with claims, payment and remittance advice processing.

One of the goals of HIPAA is to standardize basic health care transactions so that variability among providers, payers and consumers may be reduced. HIPAA generally covers health care transactions, which include verifying eligibility, verifying coverage, claims submission, adjudication (e.g., checking claim against the contract), remittance advice (e.g., explanation of what is being paid and why) and payment.

HIPAA sets standards for the electronic transmission of health care payment and remittance advice information. However, HIPAA provides broad latitude in how payers and providers may comply with these standards. Focusing on the HIPAA ASC X12N 835 transaction, which is the Health Care Claim Payment/Advice (and more commonly known as the 835) can provide further insight into the challenges presented by HIPAA. The 835 serves the function of both the paper check and RA, containing detailed payment instruction as well as claim and procedure level detail that explains the payment being made to the provider.

The 835 has a number of fields that it designates "Conditional." That is, in certain circumstances, with certain predecessors, specified fields must be present. Conversely, in other circumstances, with different predecessors, specified fields are unnecessary. In addition, the HIPAA 835 has allowances for many "optional" fields, which a payer can choose to include in a payment advice or not. Because of the permutations associated with the "Conditional" and "optional" fields, individual payers can comply with HIPAA by following dramatically different paths from other individual payers. Consequently, despite HIPAA's goal of standardization of these electronic data exchanges, providers are likely to receive a complex variety of file formats from their payer community.

This variability in compliant payer formats presents significant challenges to providers. Any given provider may have scores of payer trading partners, all submitting HIPAA-compliant 835s in different formats. The burden on the provider to receive multiple different formats of HIPAA-compliant 835s is potentially enormous. Many providers are challenged by the requirement to accept the data that HIPAA requires be contained in an electronic remittance advice. Having to manage the density of data in many different formats only exacerbates the providers' challenges.

In efforts towards HIPAA compliance, different payers and providers may transmit 835 with some variations, which leads to inefficiencies and inconsistencies. In fact, currently there are many short-term approaches being implemented by the numerous payers to become HIPAA compliant. As an example, some payers are developing proprietary websites or bulletin boards to provide EOB data to the providers. Under this system, providers may need to gain access to each individual payer's bulletin board, download the 835, and then determine if the 835 is in a format that is compatible with their accounts receivable system. In the event that the 835 is not compatible with a specific provider's accounts receivable system, the provider may need to post the RA manually, by keystroking the information into an accounts receivable system, or develop a custom work around.

Another example of current compliance efforts may involve requiring a payer to establish an Electronic Data Interface (EDI) connection with individual providers. EDI interfaces are expensive to establish and costly to operate, and generally are employed only between two trading partners with significant volume. These proposed solutions (e.g., bulletin board or EDI) pose potential reconciliation challenges, as payment will flow separately from the remittance advice. These reconciliation challenges can result in financial accounting issues as well as increased customer service call volume and other problems.

In view of the foregoing, it would be desirable to provide a method and system for transmitting and receiving bundled electronic payment and remittance advice which overcomes the above-described inadequacies and shortcomings.

SUMMARY OF THE INVENTION

According to an embodiment of the present invention, a method and system for transmitting and receiving bundled electronic payment and remittance advice for facilitating settlement of claim payments between payers and providers or suppliers.

According to an exemplary embodiment of the present invention, a computer implemented method for providing bundled electronic payment and remittance advice for facilitating at least one claim payment between a payer and a provider comprises the steps of receiving an electronic transmission from the payer wherein the electronic transmission comprises payment information and remittance advice; separating the payment information and the remittance advice; routing the payment information to a depository associated with the provider for making a payment authorized by the payer; transmitting the remittance advice to a system associated with the provider; and confirming the payment and transmission of remittance advice to the payer and the provider.

In accordance with other aspects of this particular exemplary embodiment of the present invention, the steps of routing and transmitting occur substantially simultaneously; wherein the payer is an insurance company or a government entity, the payment information comprises insurance or government payment information and the remittance advice comprises information regarding one or more claims submitted by the provider relating to services or products that the provider rendered to a patient; the provider is a health care provider; the payment information comprises one or more of insurer, government and consumer payments from multiple channels; the provider comprises a plurality of providers, each with an associated one or more depositories; the claim is a claim for payment associated with one or more health care services or products provided by the provider and received by a patient associated with the payer; the step of transmitting further comprises the step of automatically posting the remittance advice to an accounting system of the provider wherein the remittance advice is associated with a patient having a relationship with the provider; the step of transmitting further comprises the step of posting the remittance advice to an electronic bulletin board wherein the provider accesses the remittance advice through the electronic bulletin board; the step of transmitting further comprises the step of electronically delivering the remittance advice as an output file wherein the provider uploads the output file to an accounting system associated with the provider; the step of separating further comprises the step of translating the remittance advice according to predetermined criteria wherein the predetermined criteria comprises compatibility criteria related to the provider; the method comprises the step of providing an interface for enabling the payer to upload information and monitor the payment and transmission of remittance advice; the method comprises the step of providing an interface for enabling the provider to download information and monitor the payment and transmission of remittance advice; the step of separating further comprises the step of modifying the payment information to include a settlement network identifier for identifying a settlement network for facilitating settlement between a bank associated with the payer and the depository associated with the provider; the electronic transmission further comprises a unique trace number for associating the payment information and the remittance advice; the remittance advice is stored in a database, retrieved from the database and associated with a payment confirmation after the payment is made; and the step of confirming further comprises the step of reconciling the payment with the remittance advice.

According to an exemplary embodiment of the present invention, a computer implemented system for providing bundled electronic payment and remittance advice for facilitating at least one claim payment between a payer and a provider comprises a receiving module for receiving an electronic transmission from the payer wherein the electronic transmission comprises payment information and remittance advice; a parsing module for separating the payment information and the remittance advice; a routing module for routing the payment information to a depository associated with the provider for making a payment authorized by the payer; a transmitting module for transmitting the remittance advice to an intended recipient; and a confirmation module for confirming the payment and transmission of remittance advice to the payer and the provider.

According to an exemplary embodiment of the present invention, a computer implemented method for providing bundled electronic payment and remittance advice for facilitating at least one claim payment between a payer and a provider comprises the steps of receiving an electronic transmission from the payer wherein the electronic transmission comprises payment information and wherein remittance advice associated with the payment information is transmitted to a recipient; routing the payment information to a depository associated with the provider for making a payment authorized by the payer; transmitting a payment confirmation to the recipient, wherein the recipient transmits the remittance advice to the provider in response; and confirming the payment and transmission of remittance advice to the payer.

In accordance with other aspects of this particular exemplary embodiment of the present invention, the payer is an insurance company or a government entity; the provider is a health care provider; the recipient is a clearinghouse; the depository is a financial institution; the claim is a claim for payment associated with one or more health care services or products provided by the provider; the step of routing further comprises the step of modifying the payment information to include a settlement network identifier for identifying a settlement network for facilitating settlement between a bank associated with the payer and the depository associated with the provider; the electronic transmission further comprises a unique trace number for associating the payment confirmation and the remittance advice; and the step of routing further comprises the step of receiving a payment authorization confirmation from a settlement network indicating that the payment has been made.

According to an exemplary embodiment of the present invention, a computer implemented system for providing bundled electronic payment and remittance advice for facilitating at least one claim payment between a payer and a provider comprises a receiving module for receiving an electronic transmission from the payer wherein the electronic transmission comprises payment information and wherein remittance advice associated with the payment information is transmitted to a recipient; a routing module for routing the payment information to a depository associated with the provider for making a payment authorized by the payer; a transmitting module for transmitting a payment confirmation to the recipient, wherein the recipient transmits the remittance advice to the provider in response; and a confirmation module for confirming the payment and transmission of remittance advice to the payer.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

An embodiment of the present invention is directed to a method and system for transmitting and receiving bundled electronic payment and remittance advice for facilitating efficient settlement of health care claim payments (and other payments) between insurers and providers. An embodiment of the present invention facilitates electronic delivery of financial settlement (e.g., funds) with electronic remittance advice information (e.g., RAs) from payers (e.g., insurers, etc.) to providers (e.g., physicians, hospitals, etc.). An aspect of the present invention provides the ability to offer providers (e.g., physicians, hospitals, etc.) or suppliers a tiered solution for accessing and downloading the RA data in a variety of usable formats, depending upon their individual data requirements, payment volumes, technology sophistication and/or other factors, while eliminating the need to address these data access requirements in a case-by-case basis, by payer.

Figure 1:
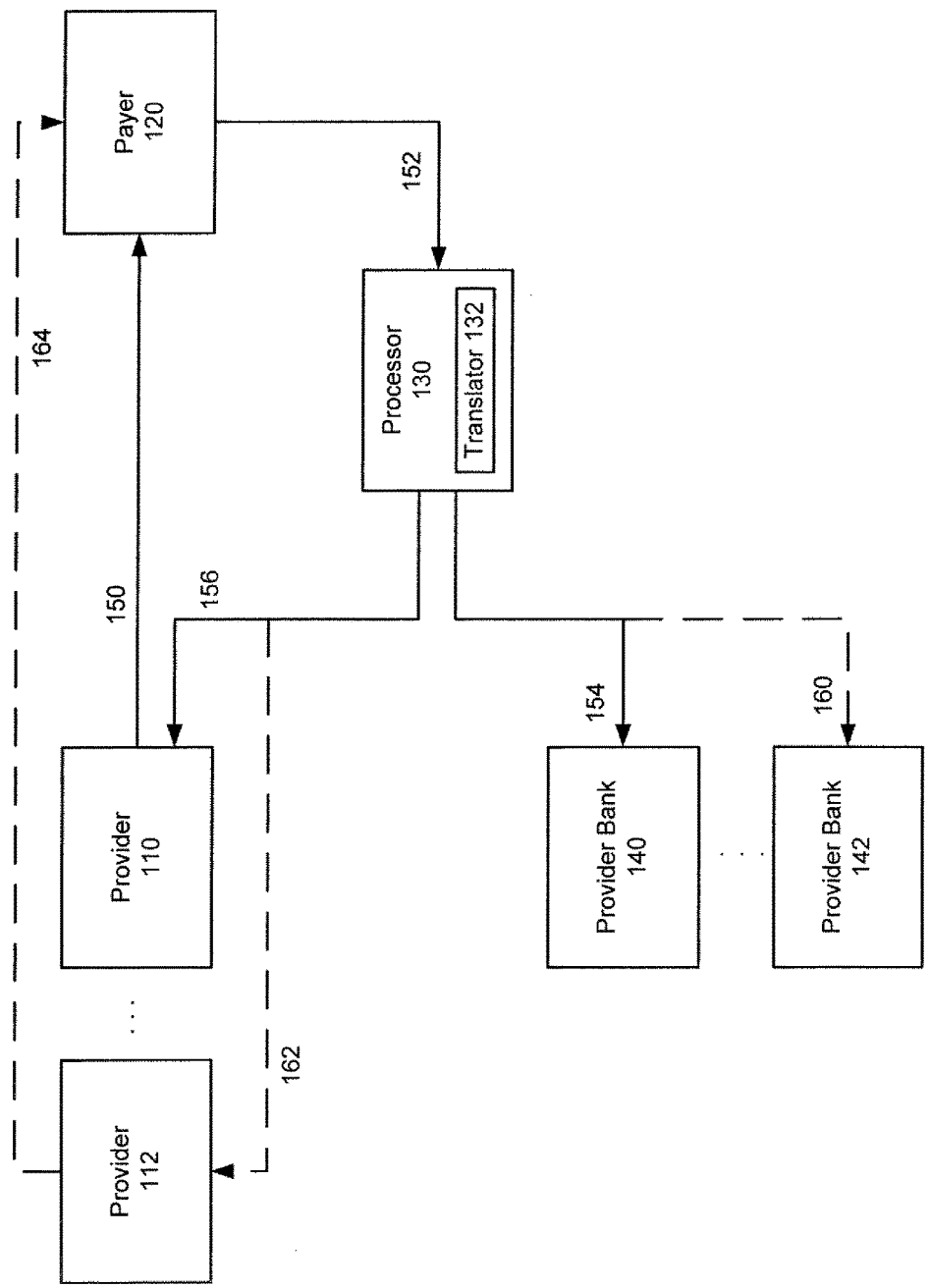
FIG. 1 is an exemplary diagram of a system for transmitting and receiving bundled electronic payment and remittance advice for facilitating settlement of claim payments between payers and providers, according to an embodiment of the present invention.

FIG. 1 is an exemplary diagram of a system for transmitting and receiving bundled electronic payment and remittance advice for facilitating settlement of claim payments between payers and providers, according to an embodiment of the present invention. Provider 110 may include a health care provider, such as doctor, hospital, dentist, surgeon, psychologist, optometrist, specialist, physical therapist, outpatient clinic, outpatient surgery center, laboratory or other provider of services and/or products related to health care. Providers may also include providers of services and/or products unrelated to health care as well. After a patient or other customer receives services and/or products, the Provider 110 may submit or forward a claim to Payer 120, as shown by 150. The claim or invoice may be transmitted in paper or electronic format. The claim, or invoice, may contain information related to the services and/or products provided by the Provider to the patient. The information may include standardized codes indicating treatment information rendered by the Provider.

Payer 120 may include insurance companies, government entity or other entities associated with the patient receiving services from Provider 110. Payer 120 may include an entity providing partial or full payment or reimbursement for some or all services and/or products provided by Provider 110 to the associated patient. In general, a contract or agreement may exist between Payer 120 and the patient receiving services from Provider 110. The contract or agreement will determine what services will receive payment and the amount of the payment. After the claim is received, Payer 120 may then adjudicate the claim to determine whether the services rendered are covered by the contract or agreement and the amount of payment. Payer 120 may adjudicate other issues, as well.

After the claim is adjudicated, Payer 120 may then electronically transmit payment information and remittance advice to Processor 130, as shown by 152. The transmission may occur via the Internet, Ethernet, Intranet, Virtual Private Network (VPN), Electronic Data Interchange (EDI) network, wireless communication and/or other modes of electronic communication. The electronic transmission may be a single electronic file and may include information from multiple adjudicated claims. The electronic transmission may also be in multiple files. The payment information may include an electronic check or other information for making an electronic payment. Payment information may include a transaction handle code, a monetary amount, a code for flagging debit or credit, a payment method code, depository financial institution code(s), account number(s), routing information, bank information and/or other information associated with an electronic payment. Remittance advice may include information related to the types of services received by a patient. For example, Payer 120 may transmit a single payment (e.g., electronic payment) and a plurality of remittance advices where each remittance advice may be specific to a patient or multiple patients. Remittance advice may also include demographic information regarding a patient, information regarding adjustments to prior payments made between the payer and provider, identifying information pertaining to the provider as well as information pertaining to the date or dates of services rendered by the provider to the patient.

As shown by 154, Processor 130 may then route the payment information to a Provider Bank 140, which may be a bank (or other financial institution or funds depository) associated with the Provider 110. As a result, funds associated with the payment information may be deposited into the Provider Bank 140. A tracker (e.g., tracking number) may be provided to facilitate payment reconciliation with remittance data.

As shown by 156, Processor 130 may automatically post the remittance advice to Provider 110 or a system associated with Provider 110. For example, the remittance advice may be automatically posted to a Provider's patient accounting system, accounts receivable system and/or Practice Management System. The remittance advice may be provided through an electronic bulletin board or delivered through an electronic channel, such as Virtual Private Network (VPN), Electronic Data Interface (EDI), electronic mail or other methods of electronic data transfer. This data transmission, as well as any of the other data transmission, may also be encrypted, encoded, or sent via other secure authenticated method for data security purposes. The transmission of remittance advice shown by 156 may occur substantially simultaneously with the routing of the payment information shown by 154. According to an embodiment of the present invention, the electronic payment shown by 154 and the posting of remittance advice shown by 156 may be linked thereby facilitating reconciliation of payments.

A plurality of Providers (e.g., 110, 112) and a plurality of Provider Banks (e.g., 140, 142) may be supported by an embodiment of the present invention. For example, a patient may receive a variety of different services from one or more providers. Providers 110 and 112 may forward claims to Payer 120, via 150 and 164, respectively. In addition, a provider may have one or more provider banks where certain payments may be routed to a first bank, via 154, and other payments may be routed to a second bank, via 160. In another example, remittance advice may be transmitted and/or posted to a plurality of providers as shown by 156 and 162. Similarly, an embodiment of the system of the present invention may support a plurality of Payers as well. As a result, an embodiment of the present invention provides a single point of contact for multiple participants through multiple methods (e.g., check, credit card, debit card, ACH, wire, etc.) thereby improving efficiencies and promoting uniformity. Therefore, a payer may send a single disbursement file with a payment and remittance advice (e.g., EOBs) information to a single point of contact, such as Processor 130. A payer may also send a separate file with payment information and a separate file with remittance advice information to a single point of contact, such as Processor 130. Processor 130 may establish and maintain connections with each payer, each payer bank, each provider and each provider bank. Remittance advice information may be posted automatically into a system associated with each Provider, such as one or more patient accounting systems or other systems. As a result, payment and remittance advice transmissions are synchronized thereby reducing reconciliation challenges. Processor 130 may receive payment and remittance advices from a number of sources (e.g., insurance companies, government entities, consumers, etc.) and provide a single point of contact through which providers may receive payment and remittance information.

According to an embodiment of the present invention, the remittance advice may be translated by translator 132 for transmission to Provider 110 or an accounting system of Provider 110. For example, one or more providers may support a variety of different accounting systems. As different accounting systems may require different information in different formats for consistency and/or compatibility, Processor 130 may translate or filter the remittance advice according to certain specifics associated with the Provider's system or other criteria. For example, a certain Provider may support an XML enabled database. The Processor 130 may then translate or filter the remittance advice received from Payer 120, via translator 132, into a format compatible with the XML database of the certain Provider. Providers may support databases in other format, as well. In addition, the data associated with the remittance advice may be filtered as certain forms may vary in format, data fields and other information. Translator 132 may be associated with Processor 130 or may function separately. Translator 132 may also be configurable by and for a given Provider, depending on their desire to do so, their technical capabilities, and access to configure the Translator 132.

According to an embodiment of the present invention, Processor 130 may handle a variety of payments associated with a plurality of services. Payments may also include consumer payments, such as co-payments, for example. In this example, Payer 120 may be a consumer and a claim from Provider 110 to Payer 120 may be a bill for services and/or products. The consumer Payer in this example may then make an electronic payment or paper payment through Processor 130 which may be routed to Provider Bank via 154 and posted to a system associated with Provider 110 via 156, in accordance with an embodiment of the present invention. Other payments from other entities through various channels may be integrated via Processor 130 according to an embodiment of the present invention. For example, payments may include a combination of insurer, government, consumer and/or other payments. In addition, the method and system of an embodiment of the present invention may be applied to any industry that involves electronic payments.

Figure 2:
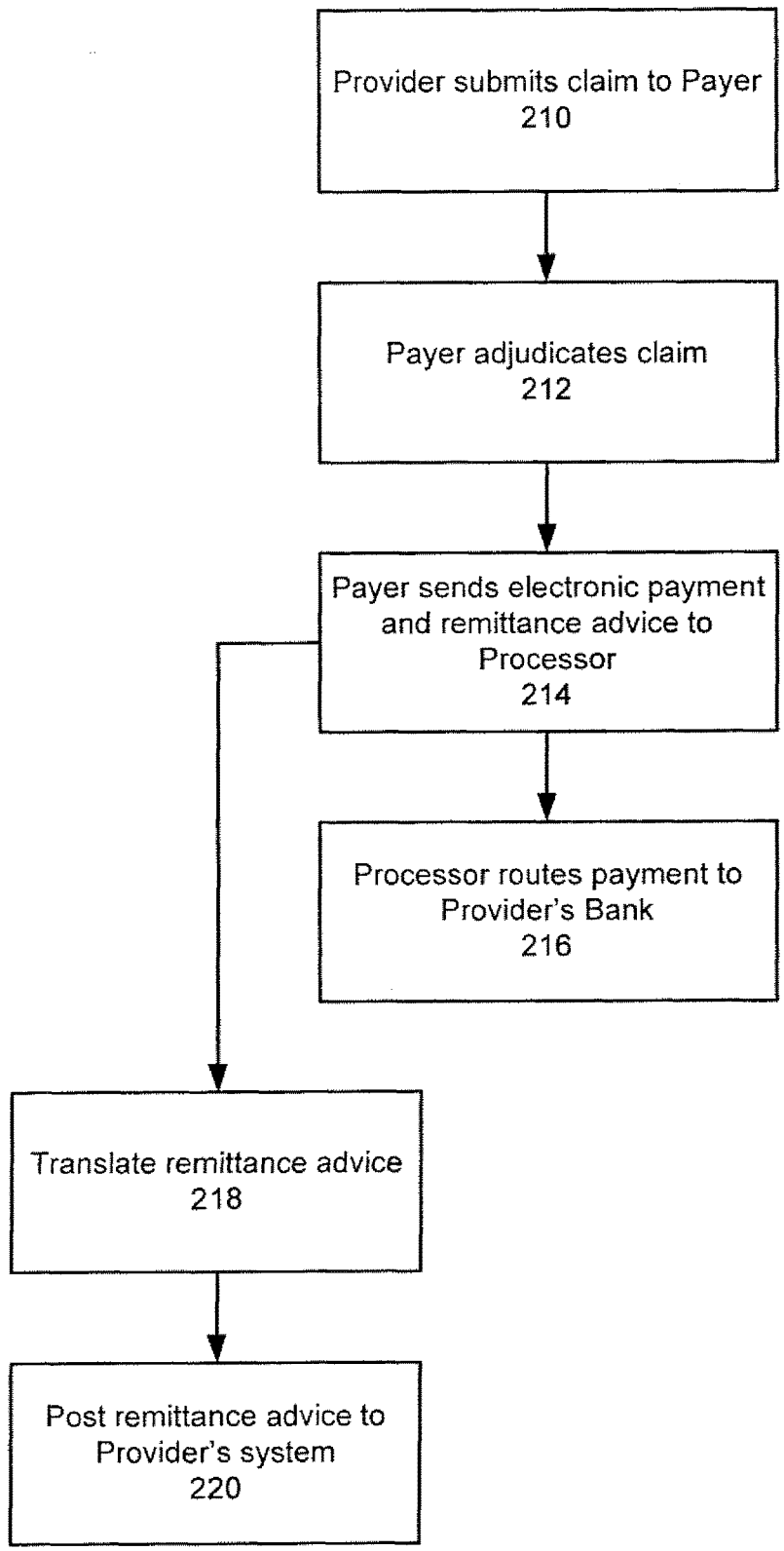
FIG. 2 is an exemplary flowchart illustrating a method for transmitting and receiving bundled electronic payment and remittance advice for facilitating settlement of claim payments between payers and providers, according to an embodiment of the present invention.

FIG. 2 is an exemplary flowchart illustrating a method for transmitting and receiving bundled electronic payment and remittance advice for facilitating settlement of claim payments between payers and providers, according to an embodiment of the present invention. At step 210, a Provider may submit a claim to a Payer for services and/or products provided by the Provider. The services and/or products may be received by an entity, such as a patient, having a relationship with the Payer. At step 212, Payer may adjudicate the claim to determine whether coverage is available and a payment amount, if applicable. Other determinations may be made. At step 214, Payer may send an electronic payment for the payment amount and remittance advice to a Processor. The electronic payment and remittance advice may be transmitted electronically as a single file or multiple files. The electronic payment may include payment for the Provider and the remittance advice may include information about the one or more patients and/or the services rendered by the Provider. At step 216, the Processor may route the electronic payment to a bank (or other financial institution or funds depository) associated with the Provider. At step 218, the remittance advice may be translated (or filtered) for transmission to a system associated with the Provider. The translating (or filtering) process may be applied for compatibility purposes. For example, the remittance advice may be translated into a format that is compatible with the system receiving the information. In addition, the data associated with the remittance advice may be filtered as certain forms may vary in format, data fields and other information. At step 220, the translated remittance advice may be posted to the Provider's system, which may include an accounting system or other system. Other forms of delivery may be implemented.

Figure 3:
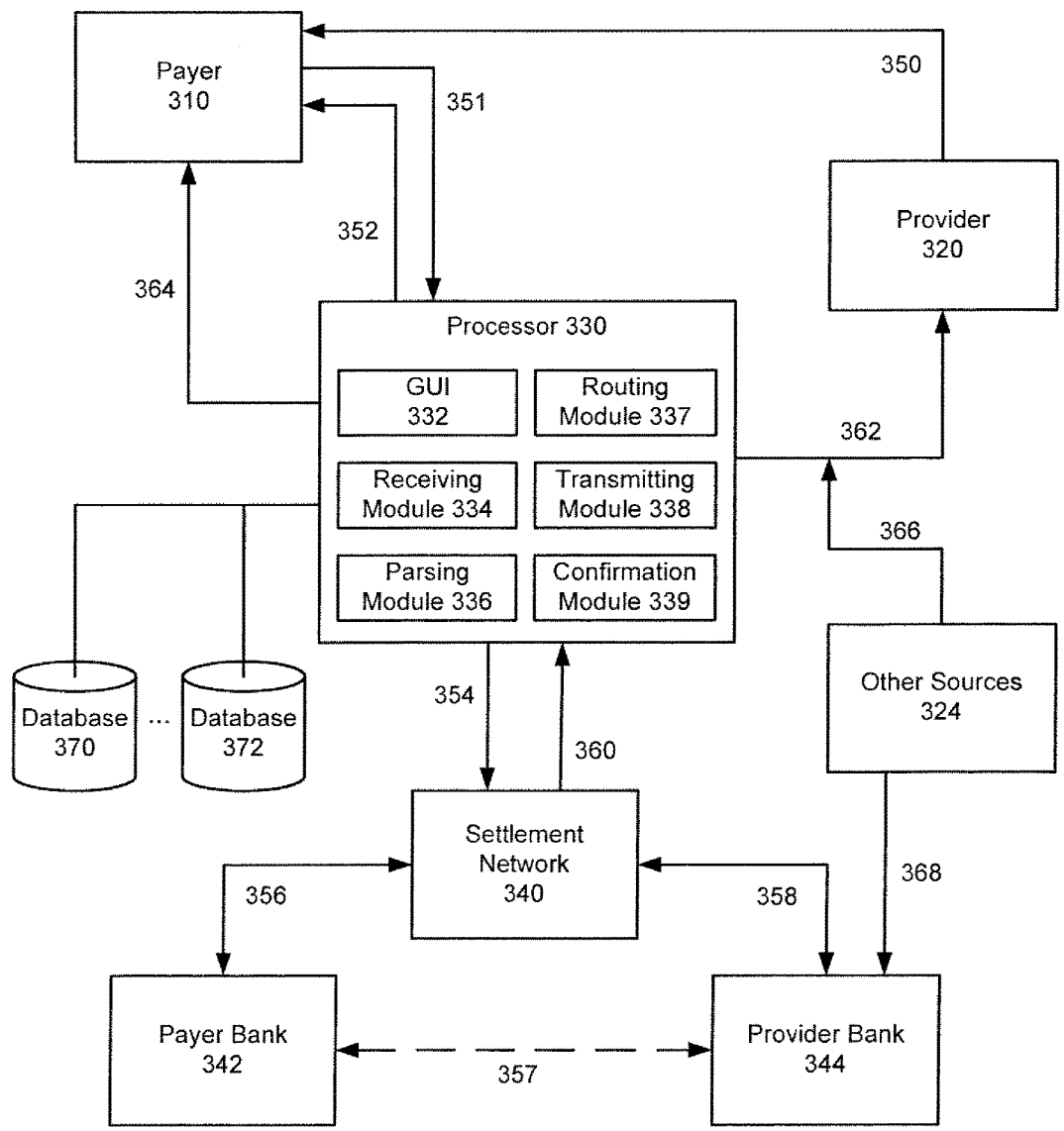
FIG. 3 is another exemplary diagram of a system for transmitting and receiving bundled electronic payment and remittance advice for facilitating settlement of claim payments between payers and providers, according to an embodiment of the present invention.

FIG. 3 is another exemplary diagram of a system for transmitting and receiving bundled electronic payment and remittance advice for facilitating settlement of claim payments between payers and providers, according to an embodiment of the present invention. After a patient or other customer receives services and/or products, Provider 320 may submit a claim to Payer 310, as shown by 350. The claim may include information related to the services and/or products provided by Provider 320. After receiving the claim, Payer 310 may transmit an electronic transmission, which may include payment information and remittance advice, to Processor 330, via 351. The remittance advice may include health care remittance advice or EOB data. In addition, a trace number (TRN) (or other tracking number) may be transmitted to Processor 330 with the electronic transmission. The TRN may be a unique identifier for each transaction, which may include a combination of a payer identifier, a provider identifier and/or a transaction specific identifier.

Payer 310 and Processor 330 interaction may occur via a graphical user interface (GUI), direct file transfer or other data sending and posting method, as illustrated by 332. Communication may be established via Internet, Ethernet, Intranet, wireless communication and/or other modes of electronic communication. The functionality associated with Processor 330 may be supported by a website or other user interface.

Processor 330 may include a variety of modules, such as Receiving Module 334, Parsing Module 336, Routing Module 337, Transmitting Module 338 and Confirmation Module 339. Additional modules providing other functionality may also be provided in accordance with an embodiment of the present invention. Further, these modules may function in combination as well as separately. GUI 332 may provide an interface for Payer 310 and Provider 320 communications. In addition, GUI 332 may provide an interface for Processor 330 and Settlement Network 340 communications.

Receiving Module 334 may receive the electronic transmission from Payer 310 and validate the received payment information and remittance advice. For example, Receiving Module 334 may support logic for validating the information received, which may involve verifying that a valid form (e.g., 835 form) has been received, verifying sufficient information has been received, checking the format of the information, checking that the information is complete, verifying required data elements and/or verifying valid relationships for payment.

Processor 330 may then prepare and transmit a confirmation message (e.g. a positive acknowledgement or a negative acknowledgement) to Payer 310, via 352. Parsing Module 336 may parse (or separate) the payment information portion of the electronic transmission. The payment information may be modified, which may depend on a Settlement Network and/or other factors. For example, data elements, such as settlement network account information, settlement network identifier and/or other information, may be added to the payment information. Routing Module 337 may route the payment information (whether unmodified or modified) with the TRN to Settlement Network 340, via 354, for payment settlement initiation. The remittance advice portion of the electronic transmission may be stored in one or more databases, as shown by 370, 372. The remittance advice may be stored with the TRN for subsequent association with a payment confirmation or the original payment information.

Settlement Network 340 may send a payment authorization to Payer Bank 342, via 356. In response, Payer Bank 342 may authorize the transfer of funds from Payer Bank 342 to Provider Bank 344, via 358, pursuant to the payment instructions. In another example, Payer Bank 342 and Provider Bank 344 may transfer funds directly, via 357. For a credit transaction, an auto-pay transaction with a statement for reconciliation may be performed. For a debit transaction, an account may be a pre-funded disbursements account for payments. After payment is made according to the payment instructions, a payment authorization confirmation may be sent from Settlement Network 340 to Processor 330, via 360. The payment authorization confirmation may include the TRN. In addition, Settlement Network 340 may not provide a payment authorization confirmation. Rather, Settlement Network 340 may transmit an error or exception report to Processor 330 in the event that settlement is not successfully facilitated.

After payment, Processor 330 may match the TRN and payment authorization confirmation with the remittance advice stored in database 370, 372. Other information in addition to or in place of the TRN may be used to match the payment authorization confirmation with the remittance advice. Processor 330 may then determine where to send the remittance advice. For example, Transmitting Module 338 may determine what information a Provider, Clearinghouse or other recipient is to receive and in what format. Further, certain relationships and/or other factors may dictate what information is to be transmitted to a particular recipient. Based on the recipient and/or other information, the remittance advice may be formatted, generated and transmitted accordingly by Transmitting Module 338.

For example, Transmitting Module 338 may electronically transmit the remittance advice to Provider 320, via 362. Remittance advice may be delivered by various methods, which may include posting to a bulletin board (or other interface) for provider download, delivery to the provider via a push functionality and/or uploading directly into the provider's account receivable system or other system. For example, Processor 330 may generate and transmit the remittance advice to an output file pushed to Provider 320, graphical user interface downloadable output file to Provider 320, and/or by an autopush into a system associated with Provider. Other methods of transmitting remittance advice may be implemented.

Confirmation Module 339 may provide Provider 320 with confirmation that the remittance advice (e.g., EOBs) or other information has been delivered and the payment has been made. In addition, Confirmation Module 339 may send an acknowledgement to Payer 310, via 364, which may include transaction confirmation of payment and remittance advice delivery. Confirmation Module 339 may further reconcile the payment with the remittance advice.

According to an embodiment of the present invention, other payments from other sources 324 (e.g., third party sources) may be made. Other sources may include lockbox, websites, customer service representatives over the telephone, Voice Response Unit (VRU) over the telephone, collections and/or other sources of payment. For example, an embodiment of the present invention may process consumer payments from multiple formats (e.g., check, credit card, debit card, ACH, etc.) through multiple channels (e.g., in person, through United States mail or other delivery service, over the Internet, over the phone, etc.) including non-electronic or other provider payments. Processor 330 may receive any type of payment, regardless of relationship. For example, remittance advice from other sources 324 may be integrated into the Processor/Provider remittance advice data stream, as shown by 366, and posted to the Provider's accounts receivable system, for example. In addition, payment information may be integrated via 368. For example, the Processor 330 may deposit payments from consumer payments as non-electronic or other payer payments into the provider's bank.

Through GUI 332, payers may upload information and monitor the progress and status of pending and/or concluded transactions. In addition, providers may download information from Processor 330 as well as view and time future payments that have already been initiated by the Payers, through GUI 332. This functionality enables providers to manage their cash and receivables more effectively. Both parties may have search, reporting, download, or other capabilities available through GUI 332.

Figure 4:
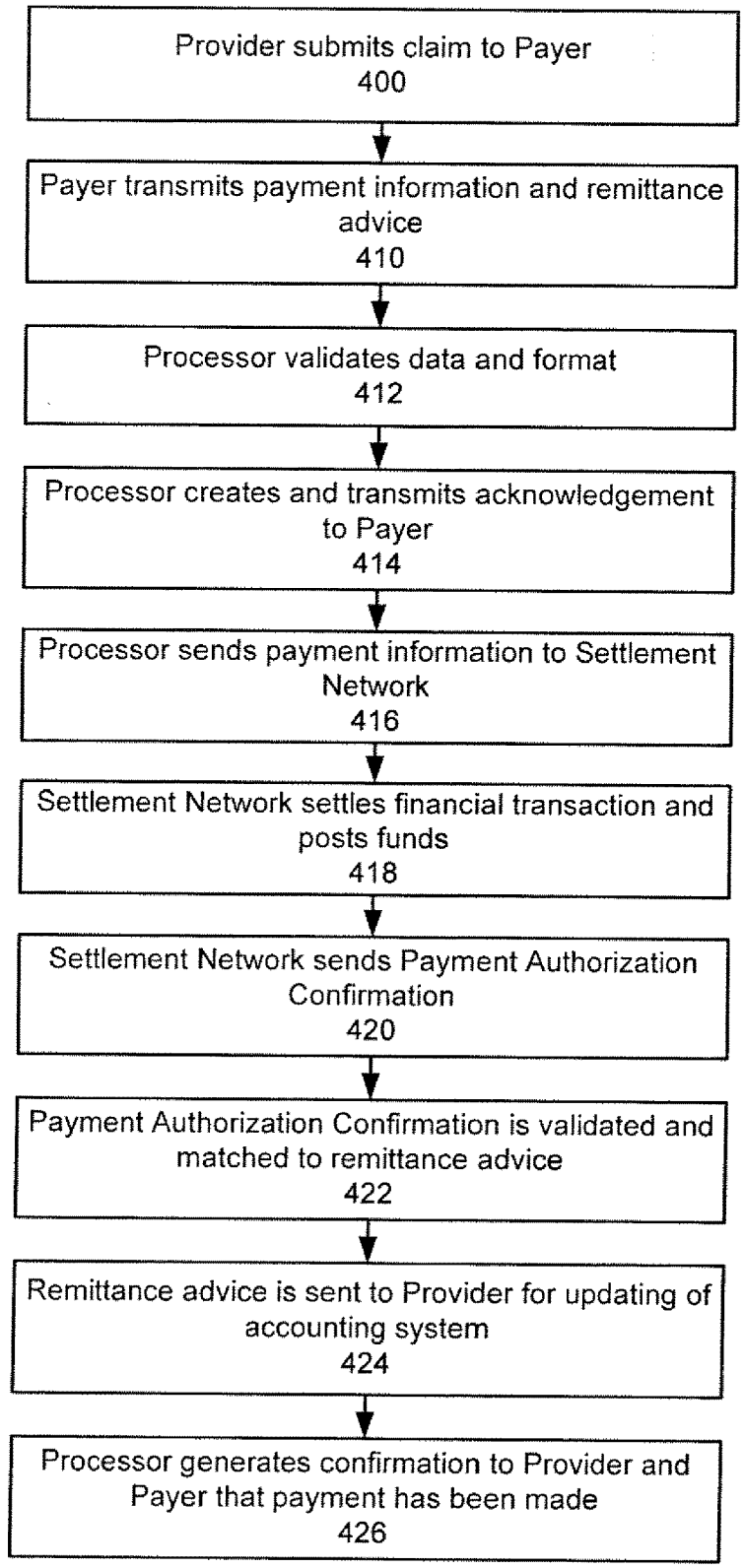
FIG. 4 is another exemplary flowchart of a method for transmitting and receiving bundled electronic payment and remittance advice for facilitating settlement of claim payments between payers and providers, according to an embodiment of the present invention.

FIG. 4 is another exemplary flowchart of a method for transmitting and receiving bundled electronic payment and remittance advice for facilitating settlement of claim payments between payers and providers, according to an embodiment of the present invention. At step 400, a Provider may submit a claim to a Payer for services and/or products provided by the Provider. The services and/or products may be received by an entity, such as a patient, having a relationship with the Payer. At step 410, a Payer may transmit an electronic transmission, which may include payment information and remittance advice. The electronic transmission may also include a TRN. The Payer may transmit the payment information and remittance advice as a single file or multiple files to a Processor via a secure mechanism, which may require user authentication. For example, security and/or encryption mechanisms may be implemented. According to an example, the payment information and remittance advice may be similar to an ANSI X12 835 message associated with HIPAA. In this example, a payer system may create a HIPAA compliant 835 form, including a TRN and remittance advice (e.g., EOB data). As specific insurer 835 forms may vary in format, data fields and other information, configurable translation may be applied.

At step 412, the Processor may validate the data and/or file format. Upon receipt of the electronic transmission, the Processor may validate that the information contained in the electronic transmission is HIPAA compliant or otherwise compliant. Other functions may include verifying that the transmission is complete; verifying payment authorization; verifying compliance with HIPAA or other standard, verifying required data elements are present (e.g., TRN, etc.), and/or establishing or verifying a valid relationship for payment (which may be previously established in system).

According to another example, for database or warehouse transactions, the payment may be stored in a database (e.g., 370, 372) for a period of time if the payer (e.g., insurer) has elected to defer the payment date, for example. In addition, remittance advice and payment data may be stored and/or archived for a period of time where Providers and Payers may access data for business and/or other purposes.

At step 414, the Processor may create and transmit an electronic payment information and remittance advice receipt acknowledgement to the Payer based on business logic conclusions, illustrated by 334. In addition, the acknowledgement may contain TRN number(s) received as well as a total value of payment instructions received. Other confirmation data may be transmitted to the Payer. The Processor may transmit an EDI 997 file to the Payer to verify whether the file was received successfully and/or indicating errors encountered. The Processor may transmit the EDI 824 file to Payer (e.g., Insurer) if file validation succeeds.

The electronic transmission may be separated into a payment instruction portion and a remittance advice portion. The remittance advice portion may be stored in one or more databases with the TRN. Upon confirmation of payment, the remittance advice data may be re-associated. The payment instruction portion may be modified by adding and/or removing data elements. For example, one or more settlement network identifiers, bank information, account information and/or other data may be added.

At step 416, the Processor may route the (modified or unmodified) payment instruction to the Settlement Network. The payment instruction may be sent via secure methods. At step 418, Settlement Network may settle the financial transaction. Payment may be made to a bank (or financial institution or other depository) associated with the Provider, pursuant to the payment instructions. At step 420, the Settlement Network may send a payment authorization confirmation to the Processor. Payment authorization confirmation may also include the TRN. In addition, Settlement Network 340 may not provide a payment authorization confirmation. Rather, Settlement Network 340 may transmit an error or exception report to Processor 330 in the event that settlement is not successfully facilitated.

At step 422, the payment authorization confirmation received may be validated and matched to the remittance advice stored in one or more databases. For example, the Processor may also match the received TRN to the original Payment Instruction (e.g., payment information with TRN and remittance advice data). In addition, if Settlement Network 340 transmits an error or exception report, Processor 330 may assume successful settlement after a period of time allowable for such error or exception reporting.

In addition, the Processor may also determine where to send remittance advice through business logic, client relationships and/or other considerations, for example. The Processor may generate the remittance advice in proper format based on the recipient. For example, the type of recipient (e.g., Provider, Clearinghouse, etc.) and the type of receiving system (e.g., XML compatible, etc.) may dictate the format, information and/or delivery method.

At step 424, the remittance advice may be sent to the Provider or other recipient for updating an accounts receivable system, patient accounting system and/or a practice management system. The remittance advice may be generated in a recipient specific format and transmitted to the recipient, via secure methods. At step 426, the Processor may generate a payment confirmation message to the Payer (e.g., Insurer) to verify that payment has been made. The Processor may also generate and transmit a confirmation message to the Provider (e.g., doctor, hospital, etc.) to verify payment and remittance advice have been received. In addition, the payment and the remittance advice may be reconciled.

Figure 5:
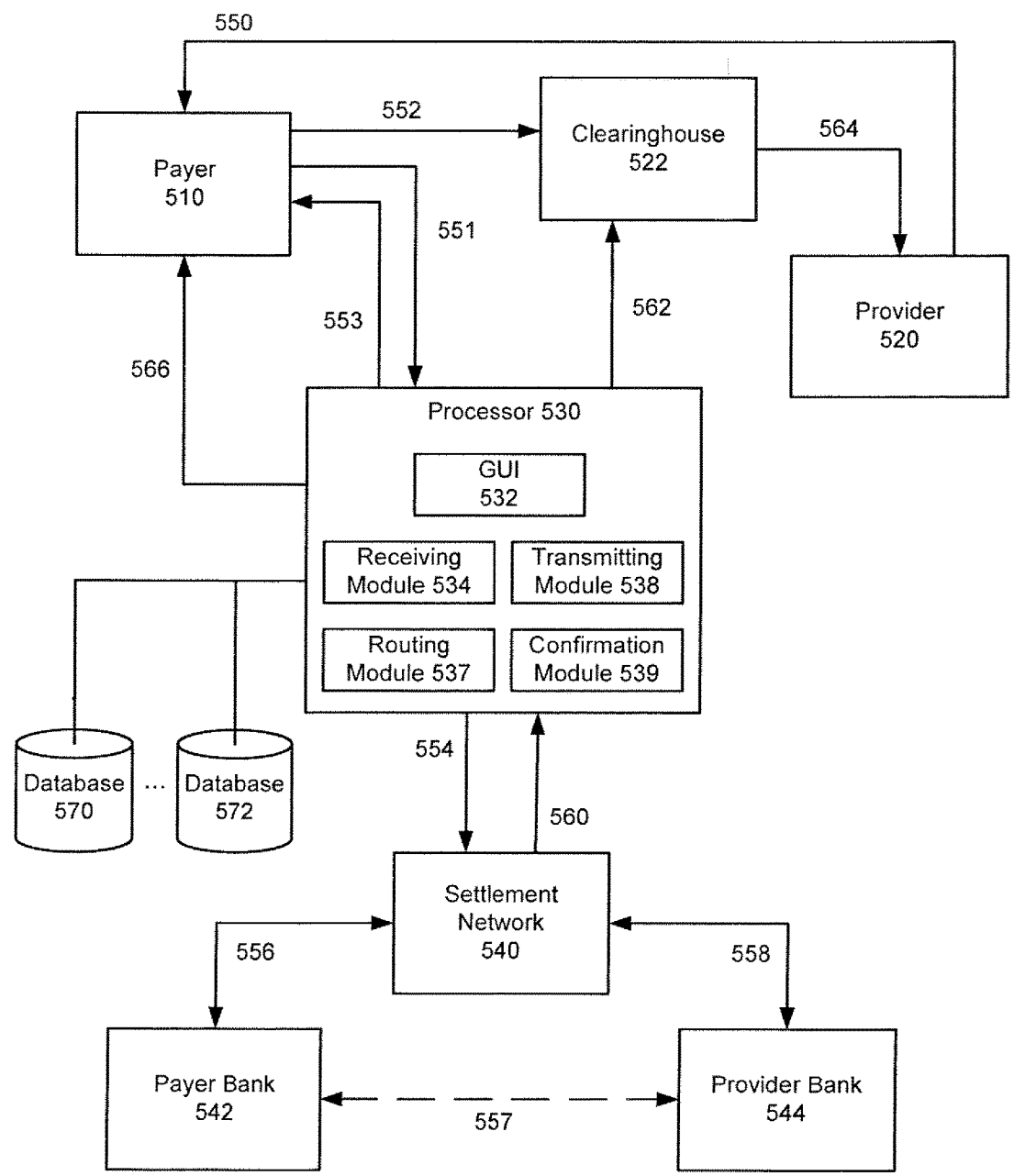
FIG. 5 is another exemplary diagram of a system for transmitting and receiving bundled electronic payment and remittance advice for facilitating settlement of claim payments between payers and providers, according to an embodiment of the present invention.

FIG. 5 is another exemplary diagram of a system for transmitting and receiving bundled electronic payment and remittance advice for facilitating settlement of claim payments between payers and providers, according to an embodiment of the present invention. After a patient or other customer receives services and/or products, Provider 520 may submit a claim to Payer 510, as shown by 550. The claim may include information related to the services and/or products provided by Provider 520. After receiving the claim, Payer 510 may transmit payment information to Processor 530, via 551. In addition, a trace number (TRN) (or other tracking number) may be transmitted to Processor 530 with the payment information. The TRN may be a unique identifier for each transaction, which may include a combination of a payer identifier, a provider identifier and/or a transaction specific identifier. In a separate electronic transmission, Payer 510 may transmit remittance advice, associated with the payment information, to Clearinghouse 522, via 552. A Clearinghouse may include any entity that collects and distributes information. For example, a Clearinghouse may include any entity that receives a communication (e.g., claims and/or invoices) from one or more providers and/or suppliers and distributes the communication (e.g., claims and/or invoices) to payers, and vice versa. A TRN may also be transmitted with the remittance advice. The remittance advice may include health care remittance advice or EOB data.

Payer 510 and Processor 530 interaction may occur via a GUI, as illustrated by 532. Communication may be established via Internet, Ethernet, Intranet, VPN, EDI, wireless communication and/or other modes of electronic communication. The functionality associated with Processor 530 may be supported by a website or other user interface.

Processor 530 may include a variety of modules, such as Receiving Module 534, Routing Module 537, Transmitting Module 538 and Confirmation Module 539. Additional modules providing other functionality may also be provided in accordance with an embodiment of the present invention. Further, these modules may function in combination as well as separately. GUI 532 may provide an interface for Payer 510 and Provider 520 communications. In addition, GUI 532 may provide an interface for Processor 530 and Settlement Network 540 communications.

Receiving Module 534 may receive the payment information from Payer 510 and validate the received payment information. For example, Receiving Module 534 may support logic for validating the information received, which may involve verifying sufficient information has been received, checking the format of the information, checking that the information is complete, verifying required data elements and/or verifying valid relationships for payment.

Processor 530 may then prepare and transmit a confirmation message (e.g. a positive acknowledgement or a negative acknowledgement) to Payer 510, via 553. The payment information may be modified, which may depend on a Settlement Network and/or other factors. For example, data elements, such as settlement network account information, settlement network identifier and/or other information, may be added to the payment information. Routing Module 537 may route the payment information (whether unmodified or modified) with the TRN to Settlement Network 540, via 554, for payment settlement initiation.

Settlement Network 540 may send a payment authorization to Payer Bank 542, via 556. In response, Payer Bank 542 may authorize the transfer of funds from Payer Bank 542 to Provider Bank 544, via 558, pursuant to the payment instructions. In another example, Payer Bank 542 and Provider Bank 544 may transfer funds directly, via 557. For a credit transaction, an auto-pay transaction with a statement for reconciliation may be performed. For a debit transaction, an account may be a pre-funded or zero-balance disbursements account for payments. After payment is made according to the payment instructions, a payment authorization confirmation may be sent from Settlement Network 540 to Processor 530, via 560. The payment authorization confirmation may include the TRN. In addition, if Settlement Network 340 transmits an error or exception report, Processor 330 may assume successful settlement after a period of time allowable for such error or exception reporting.

After payment, Transmitting Module 538 may determine what information a recipient is to receive and in what format. Further, certain relationships and/or other factors may dictate what information is to be transmitted to a particular recipient. Based on the recipient and/or other information, a payment confirmation may be formatted, generated and transmitted accordingly by Transmitting Module 538.

For example, Transmitting Module 538 may electronically transmit the payment confirmation to Clearinghouse 522, via 562. Upon receipt of payment confirmation, Clearinghouse 522 may then transmit the remittance advice to Provider 520 or to an accounts receivable system associated with the Provider 520, via 564. The payment confirmation may include the TRN (or other tracking number) which may be used to associate the payment confirmation with the correspondence remittance advice. Other information may also be used to associate the payment confirmation and the remittance advice, in addition to or in place of the TRN.

Remittance advice may be delivered by various methods, which may include posting to a bulletin board (or other interface) for provider download, delivery to the provider via a push functionality and/or uploading directly into the provider's account receivable system or other system. Confirmation Module 539 may then send an acknowledgement to Payer 510, via 566, which may include transaction confirmation of payment and remittance advice delivery.

Through GUI 532, payers may upload information and monitor the progress of transactions. In addition, providers may download information from Processor 530 as well as view and time future payments that have already been initiated by the Payers, through GUI 532. This functionality enables providers to manage their cash and receivables more effectively.

Figure 6:
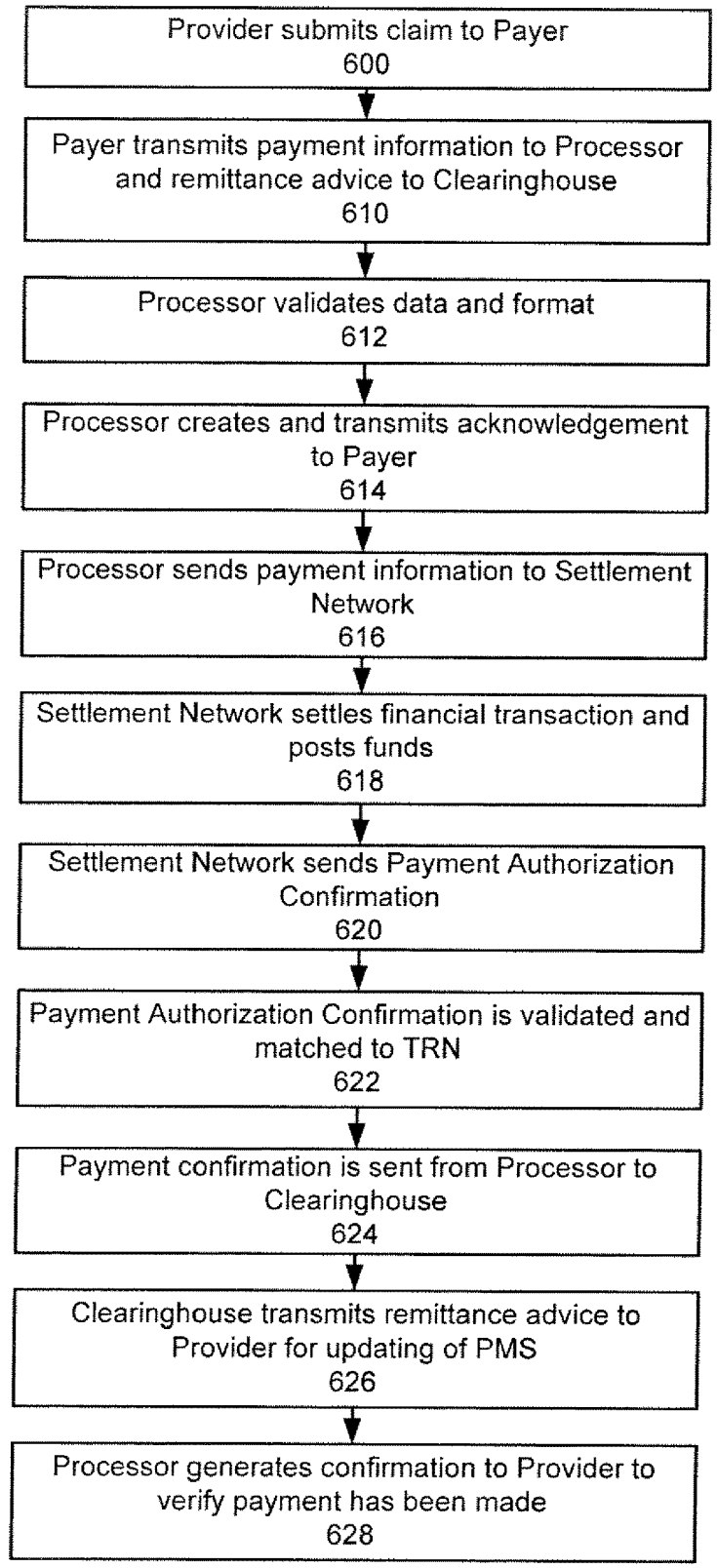
FIG. 6 is another exemplary flowchart of a method for transmitting and receiving bundled electronic payment and remittance advice for facilitating settlement of claim payments between payers and providers, according to an embodiment of the present invention.

FIG. 6 is another exemplary flowchart of a method for transmitting and receiving bundled electronic payment and remittance advice for facilitating settlement of claim payments between payers and providers, according to an embodiment of the present invention. At step 600, a Provider may submit a claim to a Payer for services and/or products provided by the Provider. The services and/or products may be received by an entity, such as a patient, having a relationship with the Payer.

At step 610, a Payer may transmit payment information to Processor 520 and remittance advice to Clearinghouse 522. The payment information may also include a TRN. According to an example, the remittance advice may be similar to an ANSI X12 835 message associated with HIPAA. In this example, a payer system may create a HIPAA compliant 835 form, including a TRN and remittance advice. As specific insurer 835 forms may vary in format, data fields and other information, configurable translation may be applied.

At step 612, the Processor may validate the data and/or file format. Upon receipt of the payment information, the Processor may validate that the information is compliant. Other functions may include verifying that the transmission is complete; verifying payment authorization; verifying required data elements are present (e.g., TRN, etc.), and/or establishing or verifying a valid relationship for payment (which may be previously established in system).

According to another example, for database or warehouse transactions, the payment may be stored in a database (e.g., 570, 572) for a period of time if the payer (e.g., insurer) has elected to defer the payment date, for example. In addition, remittance advice and payment data may be stored and/or archived for a period of time where Providers and Payers may access data for business and/or other purposes.

At step 614, the Processor may create and transmit an electronic payment information receipt acknowledgement to the Payer based on business logic conclusions. For example, the acknowledgement may contain TRN number(s) received as well as total value of payment instructions received. Other confirmation data may be transmitted to the Payer.

The payment instruction may be modified by adding and/or removing data elements. For example, one or more settlement network identifiers, bank information, account information and/or other data may be added.

At step 616, the Processor may route the (modified or unmodified) payment instruction to the Settlement Network. The payment instruction may be sent via secure methods. At step 618, Settlement Network may settle the financial transaction. Payment may be made to a bank (or financial institution or other depository) associated with the Provider, pursuant to the payment instructions. At step 620, the Settlement Network may send a payment authorization confirmation to the Processor. Payment authorization confirmation may also include the TRN. In addition, if Settlement Network 340 transmits an error or exception report, Processor 330 may assume successful settlement after a period of time allowable for such error or exception reporting.

At step 622, the payment authorization confirmation received may be validated and matched to the TRN. For example, the Processor may match the received TRN to the original payment instruction and perform other business logic functions to prepare transmission to the Clearinghouse and/or the Provider.

At step 624, the payment authorization confirmation may be sent to the Clearinghouse or other recipient. At step 626, upon receipt of the payment authorization confirmation, the Clearinghouse may transmit the remittance advice to the Provider for updating of an accounts receivable system associated with the Provider. At step 628, the Processor may generate a payment confirmation message to the Payer (e.g., Insurer) to verify that payment has been made.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A computer implemented method that manages reconciliation of payments and remittances, via an interactive interface, using an identifier that links payment data and remittance advice to facilitate reconciliation of one or more payments, wherein the method is executed by a programmed computer processor which communicates with a user via a communication network, the computer implemented method comprising the steps of:

monitoring, with the programmed computer processor, payment data associated with a healthcare provider for making a payment associated with a healthcare service or product, the payment authorized by an insurer payer, wherein the payment data is associated with a remittance advice;

transmitting the remittance advice, via the communication network, to a system associated with the healthcare provider, wherein the system associated with the healthcare provider comprises one or more of an accounts receivable system, patient accounting system and practice management system and wherein accounts receivable data is updated;

automatically linking, with the programmed computer processor, the payment data and the remittance advice to facilitate reconciliation of one or more payments, wherein the payment data and the remittance advice are associated with an identifier;

generating, via the programmed computer processor, an interactive interface via the communication network for monitoring and interacting with the payment data and the remittance advice, the interactive interface enables the healthcare provider to view and time future payments that have been initiated by the insurer payer to manage cash and receivables, the interactive interface electronically displays progress and status information associated with the payment data and remittance advice, the interactive interface further provides functionality comprising searching, reporting and downloading, the functionality performed in relation to the payment data and the remittance data, and the interactive interface enables the healthcare provider to download information and monitor the payment and transmission of remittance advice;

electronically confirming the payment and transmission of remittance advice to the healthcare provider via the network, and automatically and electronically verifying to the healthcare provider, via an electronic communication, that the payment has been made.

2. The method of claim 1, wherein the step of transmitting further comprises the step of:

automatically posting the remittance advice to the system associated with the healthcare provider wherein the remittance advice is associated with a patient having a relationship with the healthcare provider.

3. The method of claim 1, wherein the step of transmitting further comprises the step of:

posting the remittance advice to an electronic bulletin board wherein the healthcare provider accesses the remittance advice through the electronic bulletin board.

4. The method of claim 1, wherein the step of transmitting further comprises the step of:

posting the remittance advice to a secure network address wherein the healthcare provider accesses the remittance advice through a secure network.

5. The method of claim 1, wherein the step of transmitting further comprises the step of:

electronically delivering the remittance advice as an output file wherein the healthcare provider uploads the output file to an accounting system associated with the healthcare provider.

6. The method of claim 1, wherein the payment is from one or more of a lockbox, a website and a customer service representative.

7. The method of claim 1, wherein the payment comprises one or more of a check, a credit card payment, a debit card payment, an ACH transmission and electronic payment.

8. The method of claim 1, wherein the payment comprises paper payments.

9. The method of claim 1, wherein the payment comprises electronic payments.

10. The method of claim 1, further comprising the step of: translating the remittance advice according to predetermined criteria wherein the predetermined criteria comprises compatibility criteria related to the healthcare provider.

11. The method of claim 1, wherein the payment information is modified to include a settlement network identifier for identifying a settlement network for facilitating settlement between a bank associated with the insurer payer and the depository associated with the healthcare provider.

12. The method of claim 1, wherein the remittance advice is stored in a database, retrieved from the database and associated with a payment confirmation after the payment is made.

13. The method of claim 1, wherein the step of confirming further comprises the step of:

verifying to the healthcare provider that the remittance advice has been received.

14. A computer implemented system that manages reconciliation of payments and remittances, via an interactive interface, using an identifier that links payment data and remittance advice to facilitate reconciliation of one or more payments, wherein the system comprises at least a programmed computer processor which communicates with a user via a communication network, the computer implemented system comprising:

a computer store containing data relating to accounts receivable data and an identifier that links payment data and corresponding remittance advice to facilitate reconciliation of payments;

a computer processor, which computer processor is coupled to the computer store and programmed to:

electronically receive and validate payment data associated with a healthcare provider for making a payment associated with a healthcare service or product, the payment authorized by an insurer payer, wherein the payment data is associated with a remittance advice;

automatically linking the payment data and the remittance advice using an identifier to facilitate reconciliation of one or more payments;

electronically transmit, via the communication network, the remittance advice to a system associated with the healthcare provider; wherein the system associated with the healthcare provider comprises one or more of an accounts receivable system, patient accounting system and practice management system; wherein accounts receivable data is updated;

monitor and interact with, via an interactive interface, the payment data and the remittance advice via the communication network, the interactive interface enables the healthcare provider to view and time future payments that have been initiated by the insurer payer to manage cash and receivables, the interactive interface electronically displays progress and status information associated with the payment data and remittance advice, the interactive interface further provides functionality comprising searching, reporting and downloading, the functionality performed in relation to the payment data and the remittance data, wherein the interactive interface enables the healthcare provider to download information and monitor the payment and transmission of remittance advice;

electronically confirm the payment and transmission of remittance advice to the insurer payer and the healthcare provider; and automatically and electronically verify to the healthcare provider, via an electronic communication, that the payment has been made.

15. The system of claim 1, wherein the computer processor automatically posts the remittance advice to the system associated with the healthcare provider wherein the remittance advice is associated with a patient having a relationship with the healthcare provider.

16. The system of claim 1, wherein the computer processor posts the remittance advice to an electronic bulletin board wherein the healthcare provider accesses the remittance advice through the electronic bulletin board.

17. The system of claim 1, wherein the computer processor posts the remittance advice to a secure network address wherein the healthcare provider accesses the remittance advice through a secure network.

18. The system of claim 1, wherein the computer processor electronically delivers the remittance advice as an output file wherein the healthcare provider uploads the output file to an accounting system associated with the healthcare provider.

19. The system of claim 1, wherein the payment is from one or more of a lockbox, a website and a customer service representative.

20. The system of claim 1, wherein the payment comprises one or more of a check, a credit card payment, a debit card payment, an ACH transmission and electronic payment.

21. The system of claim 1, wherein the payment comprises paper payments.

22. The system of claim 1, wherein the payment comprises electronic payments.

23. The system of claim 1, wherein the remittance advice is translated according to predetermined criteria wherein the predetermined criteria comprises compatibility criteria related to the healthcare provider.

24. The system of claim 1, wherein the payment information is modified to include a settlement network identifier for identifying a settlement network for facilitating settlement between a bank associated with the insurer payer and the depository associated with the healthcare provider.

25. The system of claim 1, wherein the remittance advice is stored in a database, retrieved from the database and associated with a payment confirmation after the payment is made.

26. The system of claim 1, wherein verification that the remittance advice has been received is provided to the healthcare provider.

* * * * *